(12) United States Patent
Kondo et al.

(10) Patent No.: US 12,119,159 B2
(45) Date of Patent: Oct. 15, 2024

(54) METHOD FOR MANUFACTURING A PASSIVE ELECTRONIC COMPONENT

(71) Applicant: Taiyo Yuden Co., Ltd., Tokyo (JP)

(72) Inventors: Ryuichi Kondo, Tokyo (JP); Satoshi Tokunaga, Tokyo (JP); Yukihiro Saida, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 854 days.

(21) Appl. No.: 17/148,016

(22) Filed: Jan. 13, 2021

(65) Prior Publication Data

US 2021/0134518 A1    May 6, 2021

Related U.S. Application Data

(62) Division of application No. 15/455,308, filed on Mar. 10, 2017, now abandoned.

(30) Foreign Application Priority Data

Aug. 31, 2016   (JP) .................................. 2016-169369

(51) Int. Cl.
*H01F 7/06*       (2006.01)
*H01F 17/00*      (2006.01)
(Continued)

(52) U.S. Cl.
CPC ..... *H01F 27/2804* (2013.01); *H01F 17/0013* (2013.01); *H01F 27/29* (2013.01);
(Continued)

(58) Field of Classification Search
CPC .. H01F 27/2804; H01F 27/292; H01F 27/323; H01F 41/00; H01F 41/041;
(Continued)

(56) References Cited

U.S. PATENT DOCUMENTS 5,283,205 A * 2/1994 Sakamoto ............. G03F 9/7084
                                                         438/479
5,567,177 A   10/1996 Foerstel
(Continued)

FOREIGN PATENT DOCUMENTS

JP         61-17726 U    1/1986
JP         62-94608 U    6/1987
(Continued)

OTHER PUBLICATIONS

Notice of Reasons for Refusal dated Mar. 11, 2020 issued in corresponding Japanese Patent Application No. 2016-169369 with English translation (31 pgs.).

*Primary Examiner* — Paul D Kim
(74) *Attorney, Agent, or Firm* — Pillsbury Winthrop Shaw Pittman, LLP

(57) ABSTRACT

There is provided a passive electronic component that achieves proper recognition of a marker portion thereof that indicates a winding start position and a winding direction of a coil conductor as well as a posture and an orientation of the component. The passive electronic component is a laminated type electronic component and has an insulator portion, a terminal electrode electrically connected to a conductor portion provided inside the insulator portion and formed on a surface of the insulator portion, and a marker portion for indicating a winding start position and a winding direction of a conductor or a posture and an orientation of the component. The marker portion is disposed in a recessed portion on the surface of the insulator portion.

20 Claims, 26 Drawing Sheets

(51) Int. Cl.
  *H01F 27/28* (2006.01)
  *H01F 27/29* (2006.01)
  *H01F 27/32* (2006.01)
  *H01F 41/00* (2006.01)
  *H01F 41/04* (2006.01)
  *H01F 41/12* (2006.01)
  H01G 4/30 (2006.01)

(52) U.S. Cl.
  CPC ......... *H01F 27/292* (2013.01); *H01F 27/323* (2013.01); *H01F 41/00* (2013.01); *H01F 41/041* (2013.01); *H01F 41/122* (2013.01); *H01F 2027/2809* (2013.01); *H01G 4/30* (2013.01)

(58) Field of Classification Search
  CPC ............... H01F 41/122; H01F 17/0013; H01F 2027/2809; H01G 4/30
  See application file for complete search history.

(56) References Cited

U.S. PATENT DOCUMENTS

| | | | |
|---|---|---|---|
| 6,327,134 B1 | 12/2001 | Kuroda | |
| 7,015,566 B2 | 3/2006 | Iwase | |
| 7,336,468 B2 * | 2/2008 | Anthony | H01L 23/50 257/E23.079 |
| 7,498,611 B2 | 3/2009 | Eitoh | |
| 7,558,077 B2 | 7/2009 | Awamura | |
| 8,125,764 B2 | 2/2012 | Ishida | |
| 8,289,104 B2 | 10/2012 | Mori | |
| 8,638,543 B2 | 1/2014 | Ahn | |
| 8,754,723 B2 | 6/2014 | Masuda | |
| 9,905,355 B2 | 2/2018 | Takagi | |
| 2003/0003608 A1 | 1/2003 | Arikado | |
| 2004/0129940 A1 | 7/2004 | Iwase | |
| 2008/0042159 A1 | 2/2008 | Eitoh | |
| 2011/0250732 A1 | 10/2011 | Klingner | |
| 2012/0049974 A1 | 3/2012 | Masuda | |
| 2013/0063238 A1 | 3/2013 | Lim | |
| 2014/0284754 A1 | 9/2014 | Yamamoto | |
| 2014/0306792 A1 | 10/2014 | Yoneda | |
| 2016/0225521 A1 | 8/2016 | Yamada | |
| 2019/0035549 A1 | 1/2019 | Yamada | |

FOREIGN PATENT DOCUMENTS

| | | |
|---|---|---|
| JP | 03-206601 A | 9/1991 |
| JP | 04-70711 U | 6/1992 |
| JP | 2003-163424 A | 6/2003 |
| JP | 2004-031833 A | 1/2004 |
| JP | 2004-273625 A | 9/2004 |
| JP | 2005-045103 | 2/2005 |
| JP | 2007-242806 A | 9/2007 |
| JP | 2009-088224 A | 4/2009 |
| JP | 2010-021591 A | 1/2010 |
| JP | 2012-084623 A | 4/2012 |
| JP | 2014-127486 A | 7/2014 |
| JP | 2016-143777 A | 8/2016 |
| JP | 2016-152392 A | 8/2016 |
| JP | 61-79097 A | 9/2017 |

* cited by examiner

METHOD FOR MANUFACTURING A PASSIVE ELECTRONIC COMPONENT

CROSS-REFERENCE TO RELATED APPLICATIONS

The subject application is a Divisional Application of U.S. Ser. No. 15/455,308, filed Mar. 10, 2017, now abandoned, which claims the benefit of priority from Japanese Patent Application Serial No. 2016-169369, filed on Aug. 31, 2016, the contents of each of which is hereby incorporated by reference in their entirety.

TECHNICAL FIELD

The present invention relates to a passive electronic component and a method for manufacturing the same.

BACKGROUND

In a passive electronic component, in some cases, an orientation of the component affects properties of the component. In a coil component such as a laminated inductor, in some cases, depending on a use situation thereof, an unwinding position and a winding direction of a conductor of the coil component affect properties of the coil component. For example, in a certain use situation, a leakage magnetic field generated by a current flowing through a coil should also be in a constant direction. Here, when a winding start position or a winding direction of the conductor varies, in a case of a direct current, a direction of a leakage magnetic field is inverted. Furthermore, in a case of an alternating current, a phase of a leakage magnetic field is inverted. In either of these cases, sometimes, an adverse effect of causing variations from a designed configuration is exerted on peripheral circuitry. Because of this, in the coil component, it is required that a winding start position and a winding direction of the conductor be accurately grasped. Also in a capacitor component such as a laminated capacitor, a cross-sectional shape of the component defined by a width direction and a height direction of the component is also often not a quadrate, and thus when it is required that a posture and an orientation of the component be accurately grasped, in some cases, a marker is used as in a case of the coil component.

In mounting the coil component on a circuit substrate, as the coil component, there is used a coil component having a marker portion that indicates a winding start position and a winding direction of a conductor, and the marker portion is identified by using a technique such as image recognition or the like to check the winding start position and the winding direction of the conductor of the coil component so that the coil component is mounted on the circuit substrate with the winding start position and the winding direction of the conductor set properly.

In order to form the marker portion, conventionally, a marker is applied to a surface of an insulator portion. In this case, for example, in Japanese Patent Application Publication No. 2005-45103 ("the '103 Publication"), the marker portion is formed at a bulged position on the surface of the insulator portion.

In the technique of the '103 Publication, however, the marker portion is formed to be bulged, which has led to a problem such as that ink in the marker portion is faded due to friction or that dirt or the like adheres to the marker portion, resulting in proper image recognition of the marker portion being hindered. In view of the above, the present invention has as its object to provide a passive electronic component that achieves proper recognition of a marker portion thereof that indicates a winding start position and a winding direction of a conductor of the component as well as a posture and an orientation of the component.

SUMMARY

A passive electronic component of the present invention has an insulator portion, a conductor portion that is provided inside the insulator portion, a terminal electrode that is electrically connected to the conductor portion and formed on at least one of surfaces of the insulator portion, and a marker portion that is provided in at least one recessed portion provided on the at least one of surfaces of the insulator portion.

A method for manufacturing a passive electronic component of the present invention is a method for manufacturing a passive electronic component having a marker portion that is provided in a recessed portion on a surface of an insulator portion, which is lower in level than the surface of the insulator portion. The method includes a step of stacking lamination sheets so as to form the passive electronic component, a step of disposing the marker portion on an uppermost one of the lamination sheets, a step of press-bonding the sheets thus stacked so as to obtain a laminated body, and a step of segmenting the laminated body into units of a desired size and heat-treating the units thus obtained.

ADVANTAGES

According to the present invention, the marker portion is provided in the recessed portion on the surface of the insulator portion, and thus ink in the marker portion is prevented from being faded due to friction on the marker portion or from being detached therefrom, so that reliability in recognizing the marker portion as mounted can be improved.

DESCRIPTION OF THE PREFERRED EMBODIMENTS

Figure 1A:
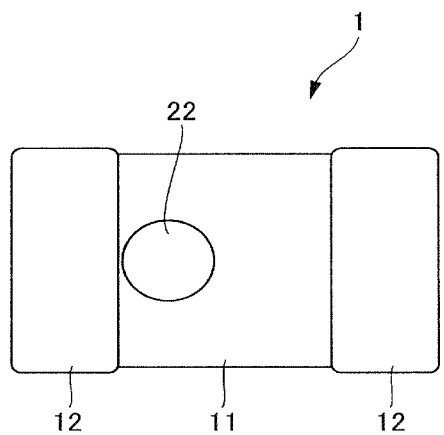
FIG. 1A is a schematic view showing an outline of a passive electronic component of the present invention.

With reference to the appended drawings as appropriate, the following describes the present invention in detail. These drawings show non-limiting illustrative examples, and the present invention is not limited to aspects shown therein. Furthermore, in the drawings, portions characteristic of the invention are sometimes depicted in a highlighted manner, and, therefore, accuracy in the scale to which various portions are drawn in the drawings is not necessarily ensured.

Figure 1B:
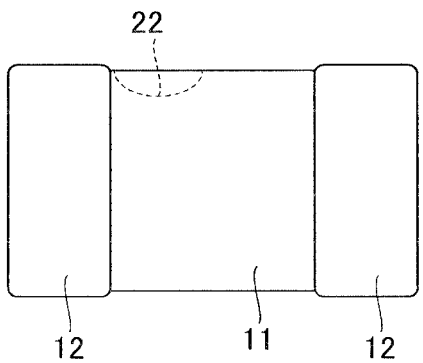
FIG. 1B is a schematic view showing an outline of the passive electronic component of the present invention.
Figure 1C:
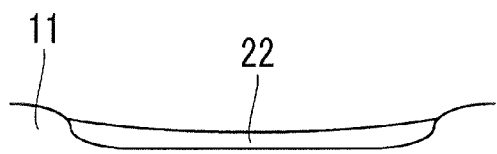
FIG. 1C is a schematic view showing an outline of the passive electronic component of the present invention.

FIGS. 1A, 1B, and 1C illustrate schematic views showing an outline of a passive electronic component of the present invention. As one example of the passive electronic component of the present invention, there is shown a coil component 1 of Embodiment 1 of the present invention. FIG. 1A is a top view of the coil component 1, FIG. 1B is a side view of the coil component 1, and FIG. 1C is an enlarged sectional view of the coil component 1. In FIG. 1B, a marker portion 22, though having the same shape as that shown in FIG. 1C, is schematically depicted in a simplified manner. The coil component 1 may be a laminated type coil component such as, for example, a laminated inductor and may have an insulator portion 11, a terminal electrode 12 electrically connected to a conductor portion provided inside the insulator portion 11 and formed on a surface of the insulator portion 11, and the marker portion 22 indicating a winding start position and a winding direction of a conductor. The marker portion 22 may be formed in a circular shape in top view and disposed in a recessed portion on a surface of the insulator portion 11. The marker portion 22 may be disposed in a neighborhood of one of two terminal electrodes 12, and by this disposition, there may be determined a winding start position and a winding direction of a conductor of the one of two terminal electrodes 12, which is closer to the marker portion 22. A surface of the marker portion 22 may be gently concave from a peripheral edge portion thereof toward a center portion thereof.

The marker portion 22 may be formed in the recessed portion, and thus a pigment of the marker portion 22 may be prevented from being faded due to friction on the marker portion 22. Furthermore, the marker portion may be prevented from being detached due to an external impact or the like. Moreover, adhesion of dirt or the like to the marker portion 22 may be prevented. In one example, the marker portion 22 may be provided so that an upper surface thereof is at a position lower in level than the surface of the insulator portion 11, and thus friction on the marker portion 22 can be prevented more reliably. Furthermore, another advantage may be that the marker portion 22 is prevented from directly interfering with an absorption pad 23 used at the time of mounting the coil component 1. While the foregoing describes the coil component 1 as an example, similar advantages may be obtained also in any other type of passive electronic component. In the passive electronic component of the present invention, an insulating body used may encompass a material that acts as a dielectric. In another aspect of the passive electronic component of the present invention, the conductor portion may form a structure of an internal electrode.

In the present invention, for the sake of convenience, the "surface" of the insulator portion 11 may refer to an arbitrary one of a plurality of surfaces of the insulator portion 11 and may not necessarily need to be at an upper portion. The marker portion 22 can be disposed on an arbitrary one of the plurality of surfaces of the insulator portion 11. It may be desirable to use, as a material of a marker, a material having a property of shrinking when heated. While glass may be used as an example in describing the present invention, there is no limitation thereto. A material of the marker portion 22 may be selected depending on a material of the insulator portion 11. For example, it may also be possible that, in a case where the insulator portion 11 is formed of a filler such as a magnetic material and a resin, a resin is used to form the marker portion 22.

Furthermore, for the sake of convenience of detection, it may also be possible to add a pigment or the like to the marker. As the pigment, metal oxides such as, for example, oxides of chrome, cobalt, iron, copper, and titanium and mixtures thereof may be used. Furthermore, in a case where a resin is used as a material of the marker, in addition to the above-described metal oxides, an organic pigment can be used. Any type of organic pigment, as long as it has resistance to heating, ultraviolet irradiation, or the like performed at the time of curing the resin, can be used without being limited by any other conditions. Furthermore, the marker portion 22 can also be whitened, in which case the marker portion 22 can be handled as the marker portion 22 using a white pigment as the above-described pigment. Representative examples thereof may include alumina (aluminum oxide), titania (titanium oxide), and so on. Fine powder of a glass-based or ceramic material, such as, for example, silica powder ($SiO_2$), barium titanate (BT) powder, strontium titanate (BST) powder, and so on can also be used. While the marker portion 22 is in a circular shape in this aspect, it may also be possible that the marker portion 22 is in a rectangular shape, an ellipse shape, or any other shape.

Figure 2:
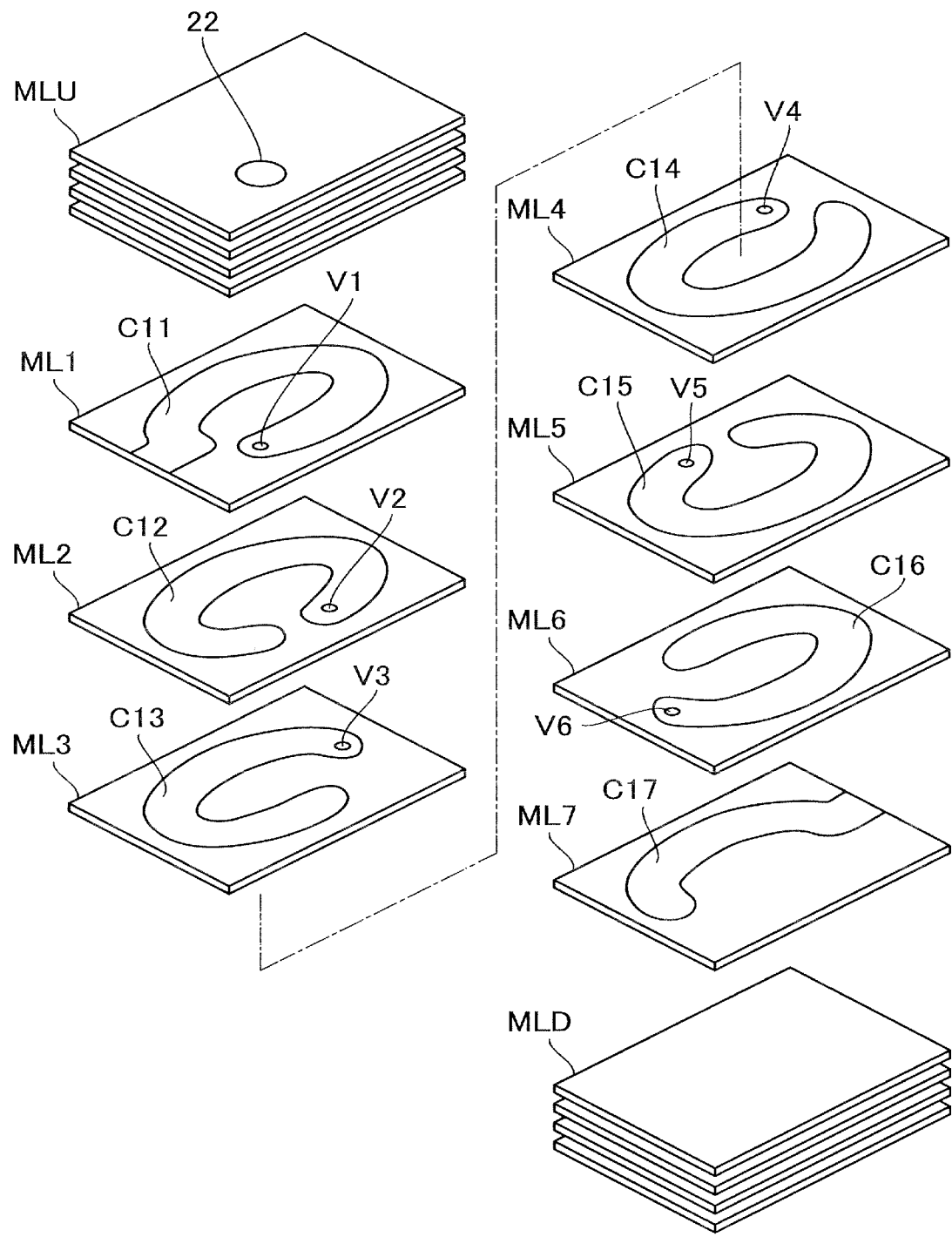
FIG. 2 is a schematic view showing a process flow of the passive electronic component of the present invention.

FIG. 2 is a schematic view showing a process flow of the passive electronic component of the present invention. There is shown a method for manufacturing a coil component 1 as one example of the passive electronic component of the present invention. In manufacturing the coil component 1 of the present invention, first, a surface of each plastic base film may be coated with a magnetic body paste prepared in advance and then be dried. Here, the magnetic body paste may contain Fe—Cr—Si alloy particles, butyl carbitol as a solvent, and polyvinyl butyral as a binder.

Next, a via V1 may be formed in a predetermined arrangement through a first magnetic body sheet ML1. In a similar manner, vias V2 to V6 may be formed in the predetermined arrangement through second and subsequent magnetic body sheets ML2 to ML6, respectively. Next, a coil conductor pattern C11 may be formed by transfer on a surface of the first magnetic body sheet ML1. Here, a conductor paste used may contain Ag particles or a metal consisting primarily of Ag, butyl carbitol as a solvent, and polyvinyl butyral as a binder. In a similar manner, coil conductor patterns C12 to C17 may be formed by transfer on surfaces of the second and subsequent magnetic body sheets ML2 to ML7, respectively. As for a coil conductor, for example, besides Ag, a metal such as Ni, Cu, Pd, Al or the like and an alloy consisting primarily thereof can also be selectively used therein as appropriate, and an auxiliary component or an additive for improving productivity, an electrical property, or weather resistance can be contained therein as appropriate. A marker may be disposed on at least one of an uppermost surface of a cover sheet MLU or a lowermost surface of a cover sheet MLD. As on example, the marker can be formed of glass.

Next, the sheets may be stacked in order so that the respective coil conductor patterns therebetween are connected to each other, and a group of lamination sheets thus obtained and the upper and lower cover layers MLU and MLD may be stacked so that the group of lamination sheets is sandwiched between the upper and lower cover layers MLU and MLD. A stacked body thus obtained may be thermally press-bonded by using a press machine, and thus a laminated body is obtained. The laminated body may be segmented into units of a desired size by using a cutter such as a dicing machine, a laser processing machine, or the like to fabricate a chip before being heat-treated. The chip before being heat-treated may be subjected to degreasing and then be heat-treated at 700° C. for forming an oxide film. In the laminated body after being heat-treated, the oxide film may be formed on surfaces of the Fe—Cr—Si alloy particles, and the particles may be bound to each other. The Ag particles in the conductor paste may be sintered to form a coil portion. The conductor paste prepared in advance may be applied to each of both end portions of the coil portion and then be heat-treated so that terminal electrodes are formed thereon. In the foregoing manner, the coil component 1 of the present invention may be obtained.

Figure 3A:
FIG. 3A is a schematic enlarged sectional view of a marker portion of the passive electronic component of the present invention shown in FIG. 2.
Figure 3B:
FIG. 3B is a schematic enlarged sectional view of the marker portion of the passive electronic component of the present invention shown in FIG. 2.
Figure 3C:
FIG. 3C is a schematic enlarged sectional view of the marker portion of the passive electronic component of the present invention shown in FIG. 2.

While the marker may be disposed on at least one of the uppermost surface and the lowermost surface, the following description is representatively directed to a case where the marker is disposed on the uppermost surface. As shown in FIGS. 3A, 3B, and 3C, in the marker portion 22, due to pressure, an uppermost one of the sheets may be recessed by an amount substantially equal to a thickness of the marker, so that respective upper surfaces of the marker and the uppermost one of the sheets may become substantially flush with each other. Furthermore, since a contact portion of the marker with the sheets may have been positionally fixed also when heated, by a heat treatment, the marker may consequently shrink in a thickness direction thereof, so that an upper surface of the marker portion 22 may recede to a position lower in level than a surface of the uppermost one of the sheets. Thus, the upper surface of the marker portion can be prevented from rubbing against or bumping into any other object. The conductor paste may contain Ag particles, glass, butyl carbitol as a solvent, and polyvinyl butyral as a binder. After that, plating may be performed so that metal films of Ni and Sn are provided on surfaces of the previously formed terminal electrodes.

FIGS. 3A, 3B, and 3C are schematic enlarged sectional views of the marker portion 22 of the coil component 1 in the manufacturing method shown in FIG. 2. As shown in FIG. 3A, a marker 22a may be disposed on an uppermost surface of lamination sheets 11a. Next, pressure may be applied to the entire sheets 11a stacked for obtaining a laminated body, and the laminated body may be segmented into units of a desired size, which may then be heated. By the pressure and heat thus applied, a transition may occur from an aspect shown in FIG. 3B to an aspect shown in FIG. 3C, so that the marker portion 22 may be disposed at a concave position on a surface of an insulator portion 11 of the laminated body. That is, the upper surface of the marker portion 22 may be formed in the recessed portion on the surface of the insulator portion 11 of the laminated body. The marker can be disposed by using a technique such as, for example, application, transfer, printing, or ink-jet printing with no limitation thereto and can be disposed by any arbitrary method. As the marker used in this manufacturing method, there may be selected, for example, glass that shrinks at a heat treatment temperature for heat-treating the magnetic body sheets. According to this method for manufacturing the coil component 1, the marker portion 22 may be formed at the same time as manufacturing the coil component 1, and thus man-hours and a manufacturing cost can be reduced. While the foregoing describes the coil component 1 as an example, similar advantages may be obtained also in any other type of passive electronic component.

With reference to FIG. 2, a description is given of a method for manufacturing another coil component 1 as Embodiment 2 of the present invention. Respective surfaces of sheets ML1 to ML7 that are plastic base films may be coated with a magnetic body paste prepared in advance and then be dried. Here, the magnetic body paste may contain an epoxy-based resin or a vinyl-based resin as a base material, magnetic body powder such as Fe—Cr—Si alloy particles or the like, and butyl carbitol as a solvent. Vias V1 to V6 may be provided at predetermined positions through the sheets ML1 to ML6, respectively, coil conductor patterns C11 to C17 each consisting primarily of Cu may be formed by transfer at predetermined positions on the sheets ML1 to ML7, respectively, the sheets may be stacked in order so that the coil conductor patterns therebetween are connected to each other, the sheets thus stacked, together with upper and lower cover sheets, are press-bonded, and thus a desired laminated body may be obtained. At this time, a marker may be disposed on at least one of an uppermost surface of a cover sheet MLU or a lowermost surface of a cover sheet MLD. The marker may be disposed by the same method as in the aforementioned manufacturing method of Embodiment 1. As for a coil conductor, for example, besides Cu, a metal such as Ni, Ag, Pd, Al or the like and an alloy consisting primarily thereof can also be selectively used therein as appropriate, and an auxiliary component or an additive for improving productivity, an electrical property, or weather resistance can be contained therein as appropriate. The marker can be formed of glass, a resin, or the like.

The laminated body may be heated, for example, in an N2 atmosphere at 300° C. for an hour so that the resin is cured without causing oxidization of the conductive patterns. The laminated body after being cured may be segmented into units of a desired size, after which terminal electrodes may be formed by using a conductive resin paste or the like. The terminal electrodes may be cured by being heated, for example, in an N2 atmosphere at 300° C. for 20 minutes. In some cases, the N2 atmosphere may not be required at the time of heating depending on a constituent material of the conductor patterns.

While the marker may be disposed on at least one of the uppermost surface and the lowermost surface, the following description is representatively directed to a case where the marker is disposed on the uppermost surface. As shown in FIGS. 3A, 3B, and 3C, in the marker portion 22, due to pressure, an uppermost one of the sheets may be recessed by an amount substantially equal to a thickness of the marker, so that respective upper surfaces of the marker and the uppermost one of the sheets may become substantially flush with each other. After that, since a contact portion of the marker with the sheets may have been positionally fixed also when heated, by a heat treatment, the marker may consequently shrink in a thickness direction thereof, so that an upper surface of the marker portion 22 may recede to a position lower in level than a surface of the uppermost one of the sheets. The conductive resin paste may contain Ag or a metal consisting primarily of Ag, a resin, and butyl carbitol as a solvent. After that, plating may be performed so that metal films of Ni and Sn are provided on surfaces of the terminal electrodes previously formed.

FIGS. 3A, 3B, and 3C are schematic enlarged sectional views of the marker portion 22 of the coil component 1 in the manufacturing method shown in FIG. 2. As shown in FIG. 3A, a marker 22a may be disposed, for example, on an uppermost surface of lamination sheets 11a. Next, pressure may be applied to the entire sheets 11a stacked for obtaining a laminated body, and then a resin is heated to be cured, after which the laminated body is segmented into units of a desired size to obtain a magnetic body chip. By the pressure and heat thus applied, a transition may occur from the aspect shown in FIG. 3B to the aspect shown in FIG. 3C, so that the marker portion 22 may be disposed at a concave position on a surface of an insulator portion 11 of the laminated body. That is, an upper surface of the marker portion 22 may be formed in a recessed portion on the surface of the insulator portion 11 of the laminated body. The marker can be disposed by using a technique such as, for example, application, transfer, printing, or ink-jet printing with no limitation thereto and can be disposed by any arbitrary method. As the marker used in this manufacturing method, there may be selected, for example, a resin that shrinks to a greater degree when the resin of the magnetic body sheets is cured to shrink. According to this method for manufacturing the coil component 1, the marker portion 22 may be formed at the same time as manufacturing the coil component 1, and thus man-hours and a manufacturing cost can be reduced. While the foregoing describes the coil component 1 as an example, similar advantages may be obtained also in any other type of passive electronic component.

Figure 4A:
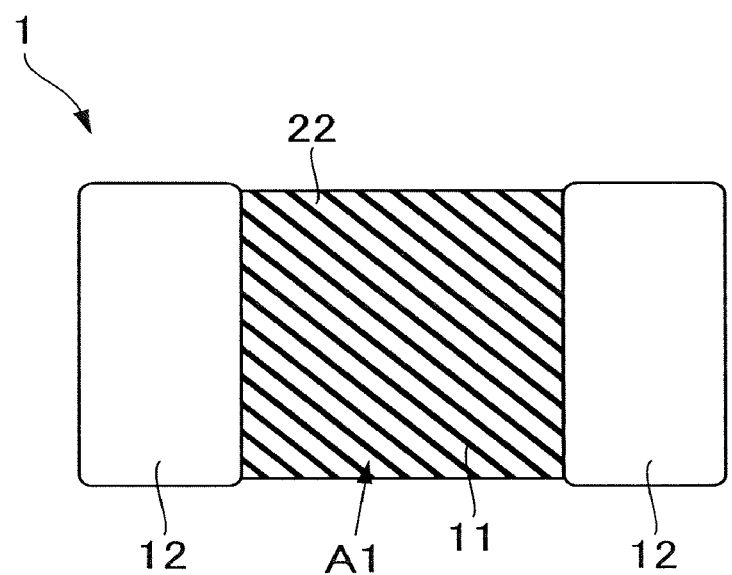
FIG. 4A is a schematic view showing a size of the marker portion of the passive electronic component of the present invention.
Figure 4B:
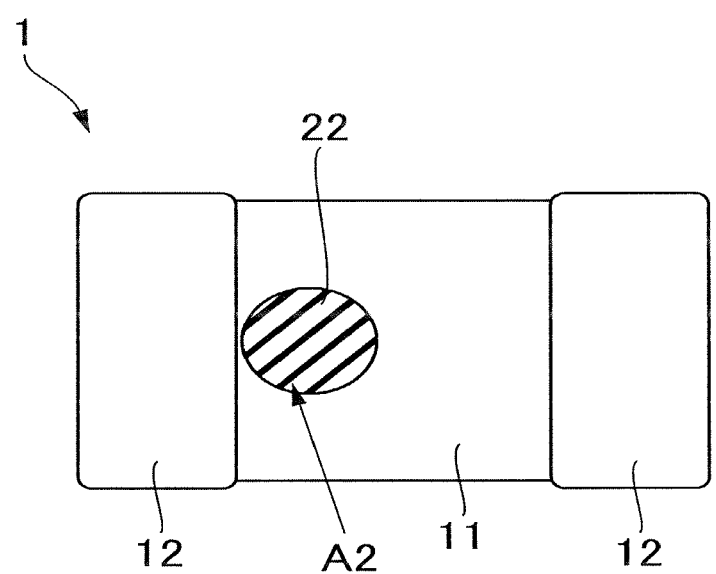
FIG. 4B is a schematic view showing a size of the marker portion of the passive electronic component of the present invention.

FIGS. 4A and 4B are schematic views showing a size of the marker portion of the passive electronic component of the present invention. There is shown a size of the marker portion 22 of the coil component 1 as one aspect of the passive electronic component of the present invention. FIG. 4A and FIG. 4B are top views of the coil component 1. The size of the marker portion 22 may be variable depending on a detection limit of a method for recognizing the marker 22. As will be mentioned later, in order to prevent interference between the marker portion 22 and the conductor portion, a via portion, an absorption pad of a mounter, or the like, it may be desirable that the marker portion 22 be reduced in size. In one example, where a surface area of an entire surface A1 (shown by hatching in FIG. 4A) of one of surfaces of the insulator portion 11 on which the marker portion 22 is formed is defined to be 100%, an area A2 (shown by hatching in FIG. 4B) of the marker portion 22 may be, preferably, not more than 40%, and more preferably, not more than 10%. For example, when the area A2 is not more than 40%, the marker portion 22 can be disposed so as to be closer to either one of the terminal electrodes 12 without coming in contact with the terminal electrodes 12. Furthermore, when the area A2 is not more than 10%, it may become easier to dispose the marker portion 22 without affecting a conductor portion 13. While the foregoing describes the coil component 1 as an example, similar advantages may be obtained also in any other type of passive electronic component.

Figure 5A:
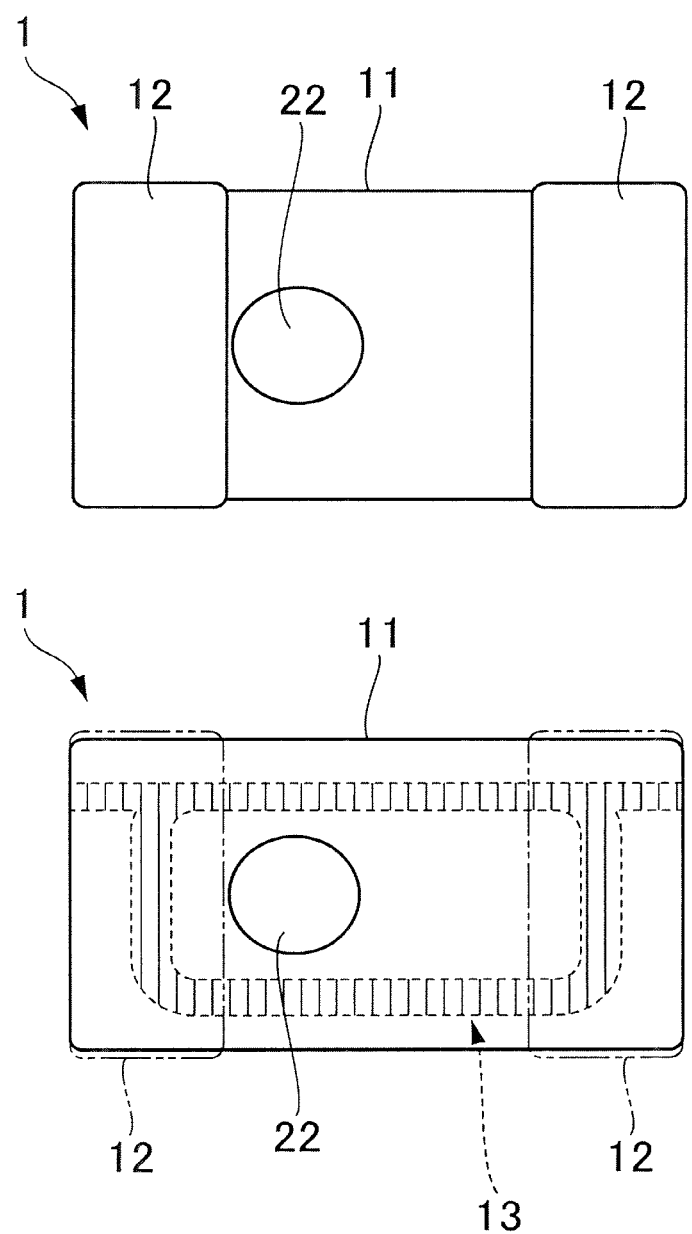
FIG. 5A illustrates a schematic view (on an upper side) showing a positional relationship between the marker portion of the passive electronic component of the present invention and a conductor portion thereof and a projected view (on a lower side) showing the same.
Figure 5B:
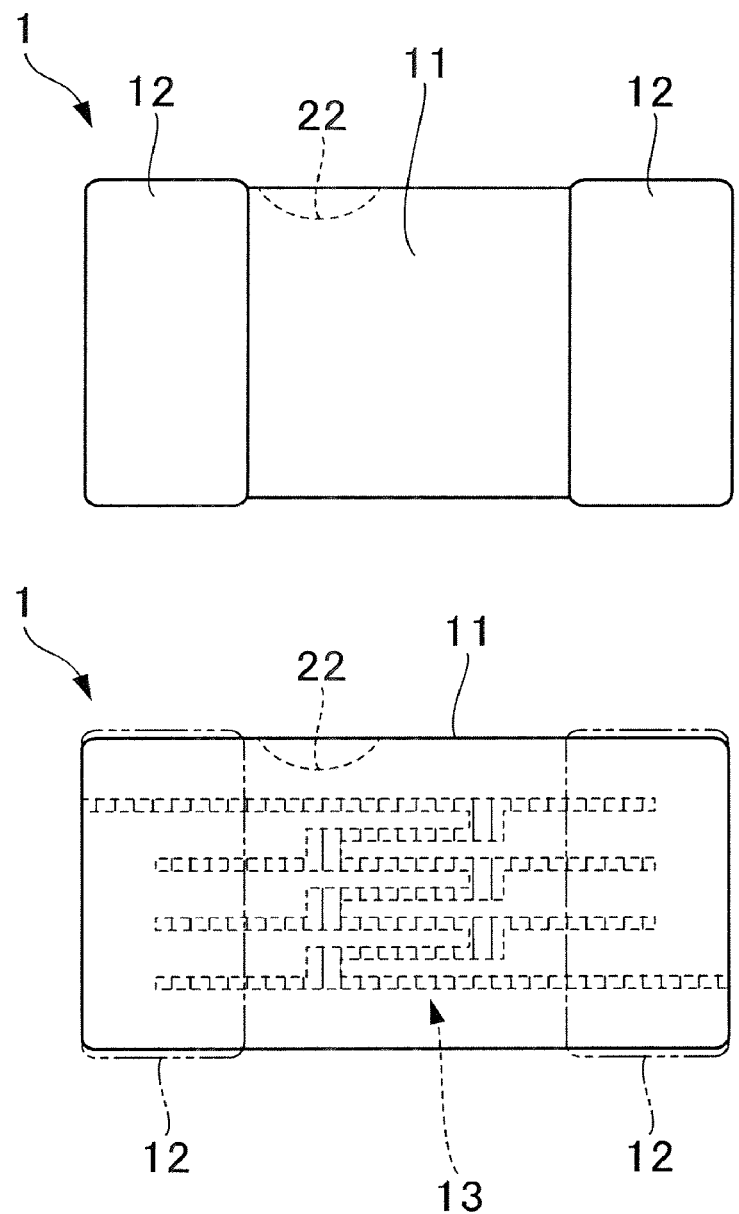
FIG. 5B illustrates a schematic view (on the upper side) showing a positional relationship between the marker portion of the passive electronic component of the present invention and the conductor portion thereof and a projected view (on the lower side) showing the same.
Figure 5C:
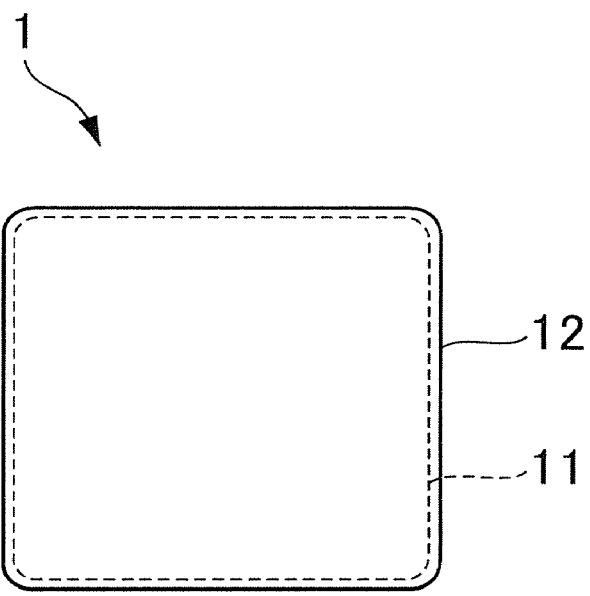
FIG. 5C illustrates a schematic view (on the upper side) showing a positional relationship between the marker portion of the passive electronic component of the present invention and the conductor portion thereof and a projected view (on the lower side) showing the same.
Figure 5C:
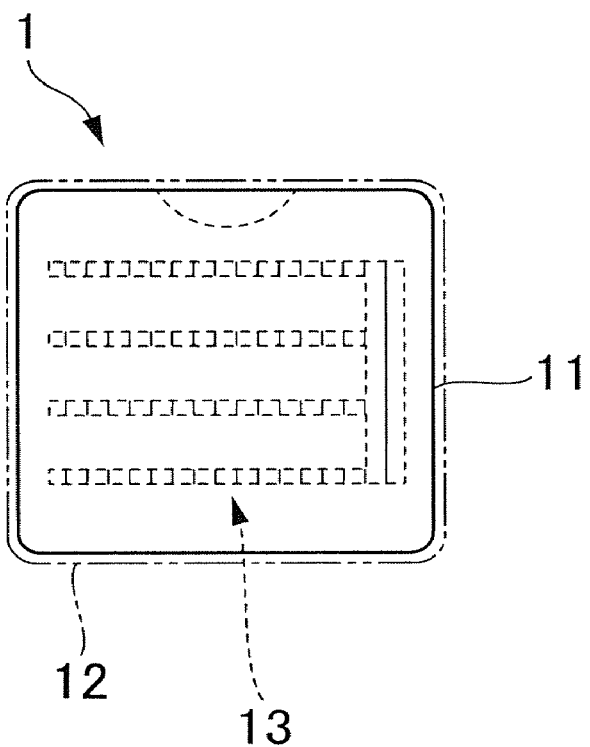

FIGS. 5A, 5B, and 5C illustrate schematic views (on an upper side) showing a positional relationship between the marker portion of the passive electronic component of the present invention and the conductor portion thereof and projected views (on a lower side) showing the same. There is shown a positional relationship between the marker portion 22 of the coil component 1 as one aspect of the passive electronic component of the present invention and the conductor portion 13 thereof. FIG. 5A illustrates top views of the coil component 1, FIG. 5B illustrates side views of the coil component 1, and FIG. 5C illustrates side views of the coil component 1 different from FIG. 5B. In FIG. 5B, the marker portion 22, though having the same shape as that shown in FIG. 1C, is schematically depicted in a simplified manner. As shown in FIG. 5A, the marker portion 22 may be provided at such a position that, when projectively viewed from the surface on which the marker portion 22 is formed, the marker portion 22 does not overlap the conductor portion 13. As shown in FIG. 5B, the marker portion 22 may be provided at such a position that, when projectively viewed from a side surface of the coil component 1, the marker portion 22 does not overlap the conductor portion 13. As shown in FIG. 5C, the marker portion 22 may be provided at such a position that, when projectively viewed from an end portion of the coil component 1, the marker portion 22 does not overlap the conductor portion 13. When pressure is applied to the marker portion 22, this portion may be recessed, and this degree of recession may propagate to a lower portion layer. In a case where the marker portion 22 is provided at such a position that, when projectively viewed from the surface on which the marker portion 22 is formed, when projectively viewed from the side surface of the coil component 1, or when projectively viewed from the end portion of the coil component 1, the marker portion 22 overlaps the conductor portion 13, the degree of recession may propagate in such a manner as to attenuate more as it propagates to a lower layer, and thus the degree of recession in a conductor may become smaller in the lower layer than in an upper layer, so that a distance between the upper layer and the lower layer may be decreased, resulting in a high risk of an electrical short circuit. Furthermore, a step height may occur between a recessed portion of the conductor portion and a non-recessed portion thereof, and there may also be a risk that, when the recessed portion and the non-recessed portion are separated from each other, a conductor width therein is decreased to increase a conductor resistance. In order to avoid these risks, in the coil component 1 of the present invention, as mentioned above, the marker portion 22 may be provided in such a manner that, when projectively viewed from each surface, the marker portion 22 does not overlap the conductor portion 13. Thus, in the coil component 1 of the present invention, the marker portion 22 may be prevented from compressing the conductor portion 13 and thus affecting an electrical property of the conductor portion 13. While the foregoing describes the coil component 1 as an example, similar advantages may be obtained also in any other type of passive electronic component.

Figure 6A:
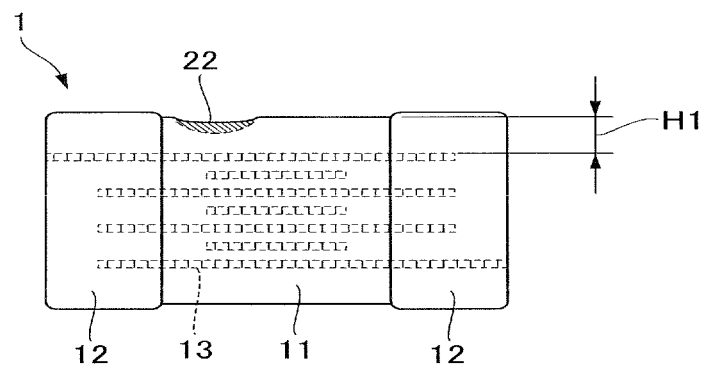
FIG. 6A is a schematic view showing a depth of the marker portion of the passive electronic component of the present invention.
Figure 6B:
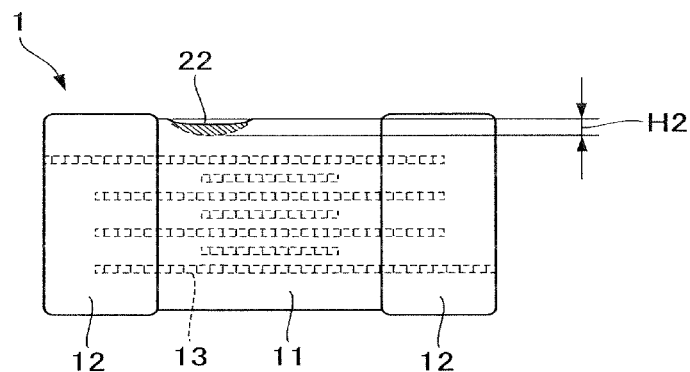
FIG. 6B is a schematic view showing the depth of the marker portion of the passive electronic component of the present invention.
Figure 6C:
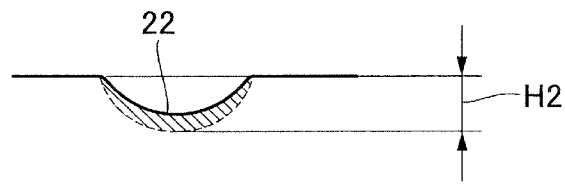
FIG. 6C is a schematic view showing the depth of the marker portion of the passive electronic component of the present invention.

FIGS. 6A, 6B, and 6C are schematic views showing a depth of the marker portion of the passive electronic component of the present invention. There is shown a depth of the marker portion 22 of the coil component 1 as one aspect of the passive electronic component of the present invention. FIG. 6A and FIG. 6B are side views of the coil component 1. FIG. 6C is a schematic enlarged sectional view of the marker portion 22 of the coil component 1 shown in FIG. 6B. It may be desirable that the marker portion 22 have such a depth as not to affect an electrical property of the conductor portion. In one example, "such a depth as not to affect an electrical property of the conductor portion" of a depth H2 of the marker portion 22 may be, preferably, smaller than 50% where a distance H1 between one of surfaces of the coil component 1 that has the marker and one of coil conductors that is closest thereto is defined to be 100%. Moreover, the depth may be, more preferably, smaller than 20%. The distance H1 may be a thickness of a portion that is generally recognized as a cover layer or a dummy layer. The depth H2 may be a distance between the surface having the marker portion 22 and a portion of the marker portion 22, which is most distant in a perpendicular direction from the surface having the marker portion 22. When the depth H2 of the marker portion 22 is smaller than 50% of the distance H1 between the surface having the marker portion 22 and the one of coil conductors that is closest to that surface, by elasticity of a material of the sheet before being heated, an amount of deformation of the sheet attributable to a thickness of the marker can be reduced. When the depth H2 of the marker portion 22 is smaller than 20% of the distance H1 between the surface having the marker portion 22 and the one of coil conductors that is closest to that surface, an amount of deformation of the sheet attributable to a thickness of the marker can be mostly absorbed. Thus, the marker portion 22 and the conductor portion may be prevented from interfering with each other and thus causing a short circuit of the conductor portion. Furthermore, a volume used for forming the marker portion 22 may be reduced, and thus a decrease in the volume occupied by the insulating body 11 can be suppressed, so that designed capabilities of the coil component 1 can be maintained. The depth of the marker portion 22 may correspond to a cross section of a center portion thereof as seen from a plane of the marker portion 22. This can be easily recognized by performing cross-section polishing with respect to the marker portion 22 and observing the marker portion 22 in an enlarged manner. While a magnification of this enlargement can vary depending on a size of the marker portion, it may be possible to set the magnification to, for example, about 100 times. While the foregoing describes the coil component 1 as an example, similar advantages may be obtained also in any other type of passive electronic component.

Figure 7A:
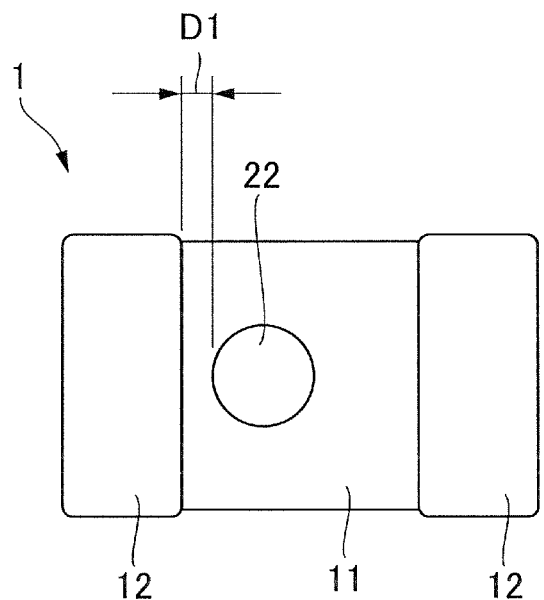
FIG. 7A is a schematic view showing a positional relationship between the marker portion of the passive electronic component of the present invention and a terminal electrode thereof.
Figure 7B:
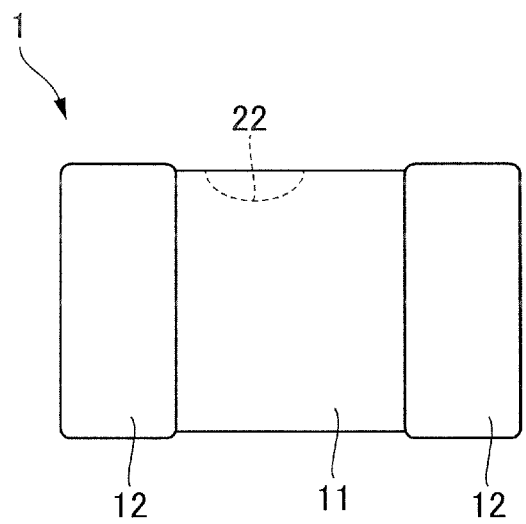
FIG. 7B is a schematic view showing a positional relationship between the marker portion of the passive electronic component of the present invention and the terminal electrode thereof.

FIGS. 7A and 7B are schematic views showing a positional relationship between the marker portion of the passive electronic component of the present invention and the terminal electrode thereof. There is shown a positional relationship between the marker portion 22 of the coil component 1 of the passive electronic component as one aspect of the present invention and the terminal electrode 12 thereof. FIG. 7A is a top view of the coil component 1 and FIG. 7B is a side view of the coil component 1. In FIG. 7B, the marker portion 22, though having the same shape as that shown in FIG. 1C, is schematically depicted in a simplified manner. The marker portion 22 may be at such a position as not to be in contact with the terminal electrode 12. In one example, the marker portion 22 and the terminal electrode 12 may be spaced from each other by a minimum distance D1. Thus, in the coil component 1 of the present invention, the marker portion 22 may be prevented from affecting an electrical property of the coil component 1. In a case where the marker portion 22 is in contact with the terminal electrode 12 as formed, an adverse effect may be exerted on linearity of the terminal electrode 12 in a contact portion thereof with the marker portion 22. In a case where linearity of the terminal electrode 12 is not maintained, particularly when the component is of a small size, a distance between the terminal electrode 12 and the other terminal electrode on the other side may be decreased, resulting in an increased risk of a short circuit. In order to avoid this risk, in the coil component 1 of the present invention, the marker portion 22 may be configured not to be in contact with the terminal electrode 12, thereby preventing such a contact from affecting formation of the terminal electrode 12. While the foregoing describes the coil component 1 as an example, similar advantages may be obtained also in any other type of passive electronic component.

Figure 8A:
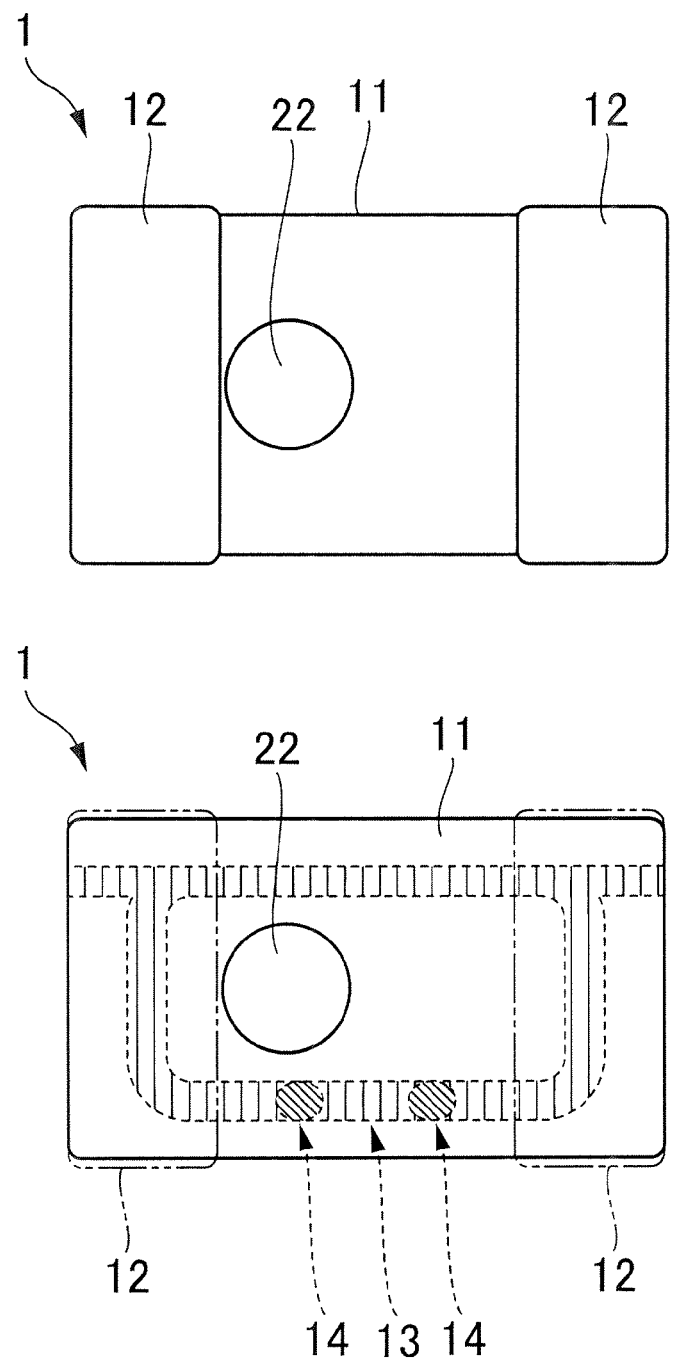
FIG. 8A illustrates a schematic view (on an upper side) showing a positional relationship between the marker portion of the passive electronic component of the present invention and a via portion thereof and a projected view (on a lower side) showing the same.
Figure 8B:
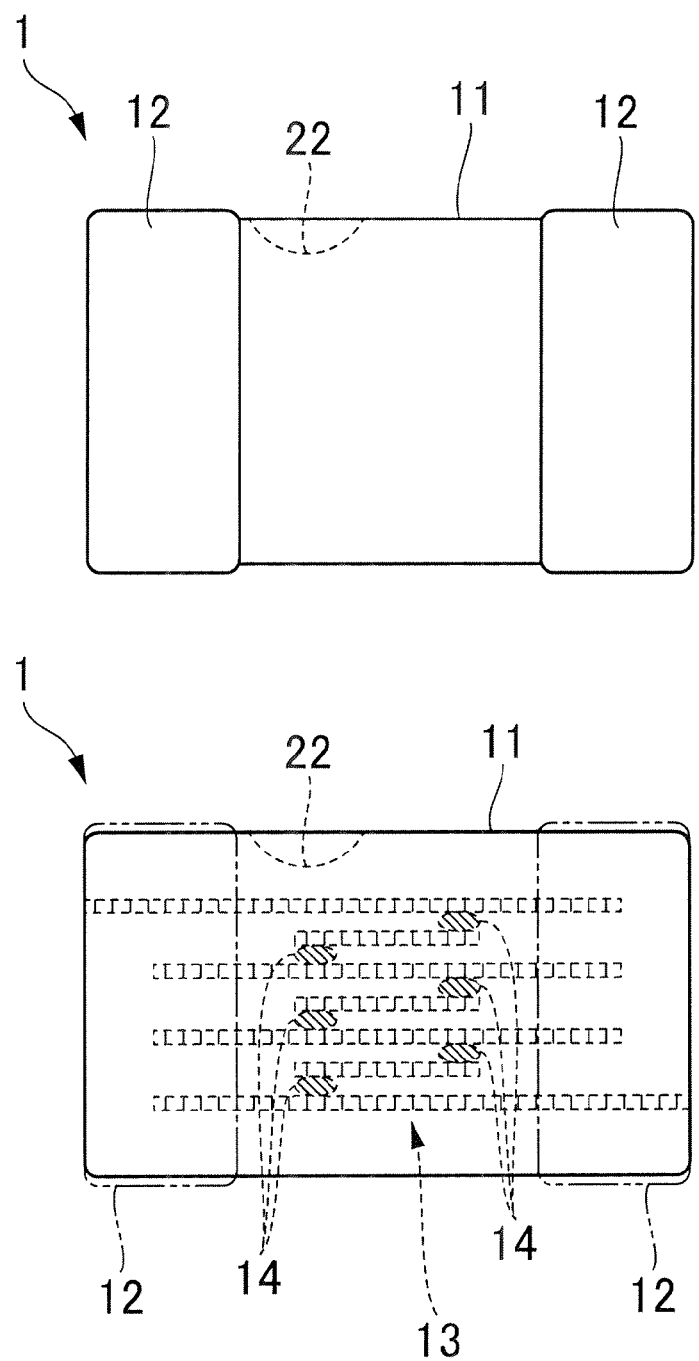
FIG. 8B illustrates a schematic view (on the upper side) showing a positional relationship between the marker portion of the passive electronic component of the present invention and the via portion thereof and a projected view (on the lower side) showing the same.
Figure 8C:
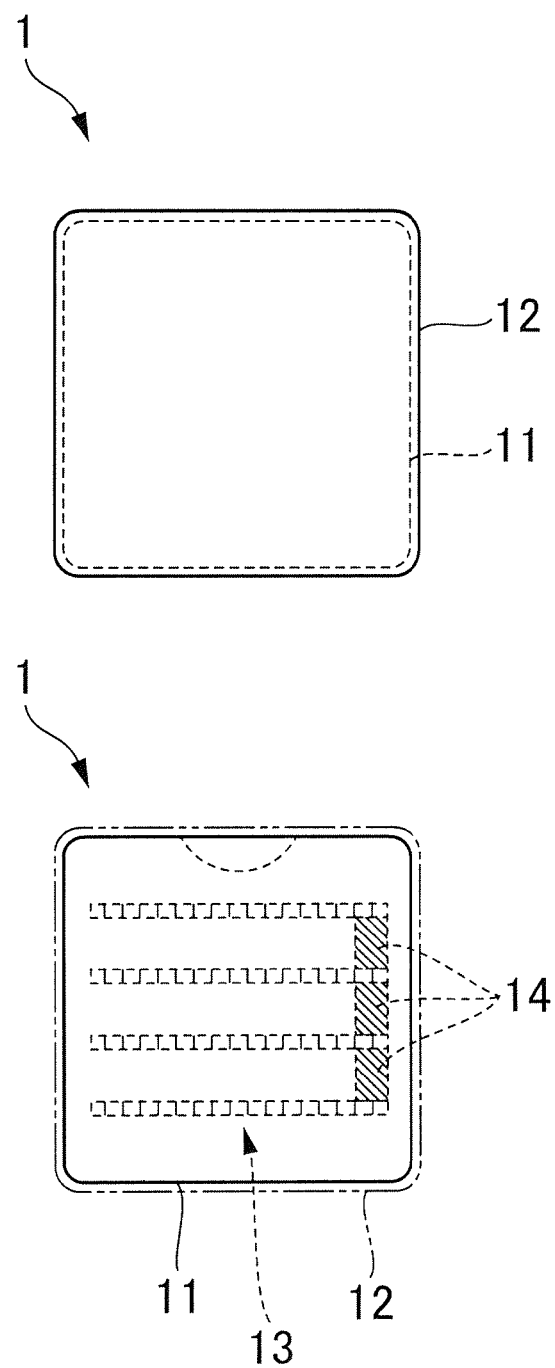
FIG. 8C illustrates a schematic view (on the upper side) showing a positional relationship between the marker portion of the passive electronic component of the present invention and the via portion thereof and a projected view (on the lower side) showing the same.

FIGS. 8A, 8B, and 8C illustrate schematic views (on an upper side) showing a positional relationship between the marker portion of the passive electronic component of the present invention and the via portion thereof and projected views (on a lower side) showing the same. There is shown a positional relationship between the marker portion 22 of the coil component 1 as one aspect of the passive electronic component of the present invention and a via portion 14 thereof. FIG. 8A illustrates top views of the coil component 1, FIG. 8B illustrates side views of the coil component 1, and FIG. 8C illustrates side views of the coil component 1 different from FIG. 8B. In FIG. 8B, the marker portion 22, though having the same shape as that shown in FIG. 1C, is schematically depicted in a simplified manner. As shown in FIG. 8A, the marker portion 22 may be provided at such a position that, when projectively viewed from the surface on which the marker portion 22 is formed, the marker portion 22 does not overlap the via portion 14. As shown in FIG. 8B, the marker portion 22 may be provided at such a position that, when projectively viewed from the side surface of the coil component 1, the marker portion 22 does not overlap the via portion 14. As shown in FIG. 8C the marker portion 22 may be provided at such a position that, when projectively viewed from the end portion of the coil component 1, the marker portion 22 does not overlap the via portion 14. When pressure is applied to the marker portion 22, this portion may be recessed, and this degree of recession may propagate to a lower portion layer. In a case where, when projectively viewed from the surface on which the marker portion 22 is formed, when projectively viewed from the side surface of the coil component 1, or when projectively viewed from the end portion of the coil component 1, the marker portion 22 is at such a position as to overlap the via portion 14, an electrical property may be degraded, i.e., for example, a degree of recession that has propagated may affect connectivity of the via portion, and an inter-conductor distance may be decreased to cause a short circuit between conductors. In order to avoid such situations, in the coil component 1 of the present invention, as mentioned above, the marker 22 may be provided in such a manner that, when projectively viewed from each surface, the marker portion 22 does not overlap the via portion 14. Thus, in the coil component 1 of the present invention, the marker portion 22 may be prevented from interfering with the via portion 14 and thus affecting an electrical property of the coil component 1. While the foregoing describes the coil component 1 as an example, similar advantages may be obtained also in any other type of passive electronic component.

Figure 9A:
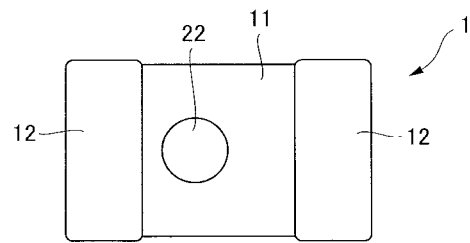
FIG. 9A is a schematic view showing one aspect of the marker portion of the passive electronic component of the present invention.
Figure 9B:
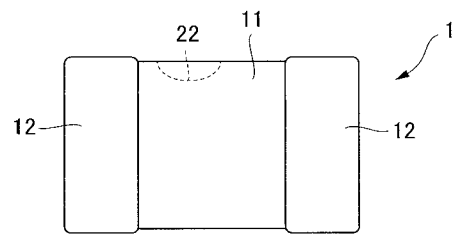
FIG. 9B is a schematic view showing one aspect of the marker portion of the passive electronic component of the present invention.
Figure 9C:
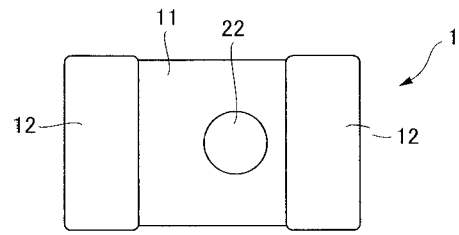
FIG. 9C is a schematic view showing one aspect of the marker portion of the passive electronic component of the present invention.
Figure 9D:
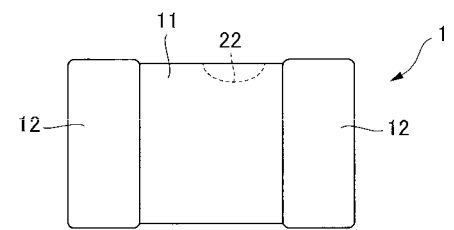
FIG. 9D is a schematic view showing one aspect of the marker portion of the passive electronic component of the present invention.

FIGS. 9A, 9B, 9C, and 9D are schematic views showing one aspect of the marker portion of the passive electronic component of the present invention. There is shown a method for indicating, based on a position of the marker portion 22, a winding start position and a winding direction of a conductor in the coil component 1 as one aspect of the passive electronic component of the present invention. FIGS. 9A and 9C are top views of the coil component 1 and FIGS. 9B and 9D are side views of the coil component 1. In FIGS. 9B and 9D, the marker portion 22, though having the same shape as that shown in FIG. 1C, is schematically depicted in a simplified manner. Based on a position of the marker portion 22 on the surface of the insulator portion 11, there may be indicated a winding start position and a winding direction of a conductor of the coil component 1. As one example, in FIGS. 9A and 9B, the marker portion 22 may be disposed in a neighborhood of one of the terminal electrodes 12 that is on a left side in the figures, thus indicating a winding start position and a winding direction of a conductor of the left-side one of the terminal electrodes 12. As another example, in FIGS. 9A and 9B, the marker portion 22 may be disposed in a neighborhood of one of the terminal electrodes 12 that is on a right side in the figures, thus indicating a winding start position and a winding direction of a conductor of the right-side one of the terminal electrodes 12. While the foregoing describes the coil component 1 as an example, also in any other type of passive electronic component, a posture and an orientation of the component may be indicated, thus providing similar advantages.

Figure 10A:
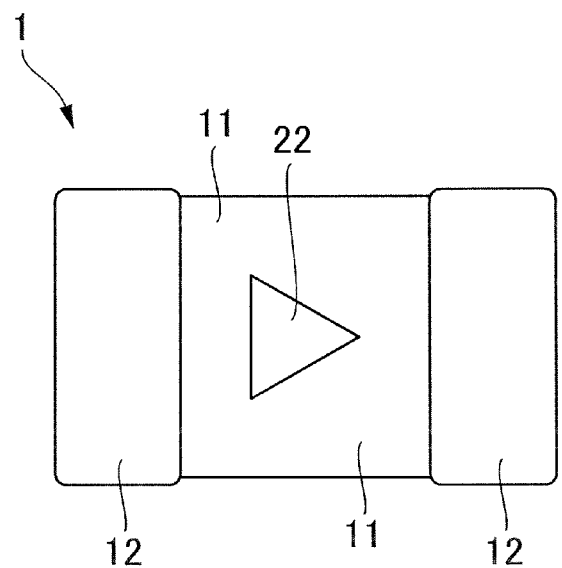
FIG. 10A is a schematic view of a passive electronic component as one aspect of the present invention.
Figure 10B:
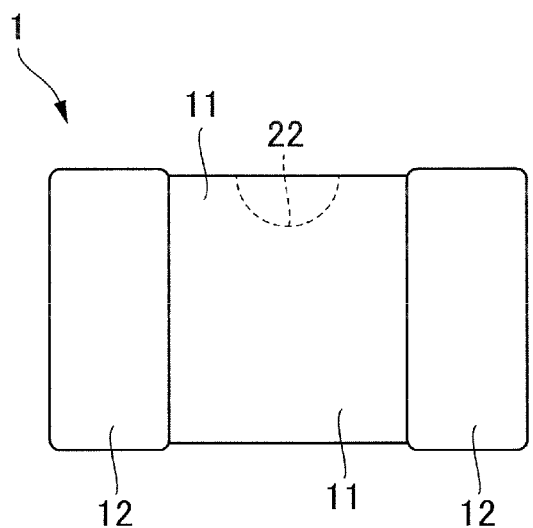
FIG. 10B is a schematic view of the passive electronic component as one aspect of the present invention.

FIGS. 10A and 10B are schematic views of a passive electronic component as one aspect of the present invention. There is shown, as an illustrative example, a coil component 1 as one aspect of the passive electronic component of the present invention. FIG. 10A is a top view of the coil component 1 and FIG. 10B is a side view of the coil component 1. In FIG. 10B, a marker portion 22, though having the same shape as that shown in FIG. 1C, is schematically depicted in a simplified manner. In this aspect, the marker portion 22 provided on a surface of an insulator portion 11 of the coil component 1 may be in an asymmetrical shape. "Being in an asymmetrical shape" may refer to a state where the shape is not required to be asymmetrical with respect to all axes therein but is asymmetrical with respect to at least one of the axes therein, and this asymmetry property can indicate an orientation. For example, an equilateral triangle may be, though being symmetrical with respect to an axis of a normal extending from each vertex thereof to an opposed side thereof, asymmetrical with respect to each axis connecting midpoints of arbitrary two of sides thereof, and this asymmetry property can indicate an orientation. Thus, in the present invention, an equilateral triangle may also be included in asymmetrical shapes. In one example, the marker portion 22 may be in the shape of a triangle and provided so as to be asymmetrical with respect to an axis orthogonal to an axis connecting terminal electrodes to each other, and an orientation of the triangle may indicate a winding start position and a winding direction of a conductor of the coil component 1. That is, regardless of a position of the marker portion 22, based on a shape of the marker portion 22, there may be indicated a winding start position and a winding direction of a conductor of the coil component 1. It may be also possible that the marker portion 22 is configured to be in a shape other than a triangle as long as the shape is asymmetrical. While the foregoing describes the coil component 1 as an example, also in any other type of passive electronic component, a posture and an orientation of the component may be indicated, thus providing similar advantages.

Figure 11A:
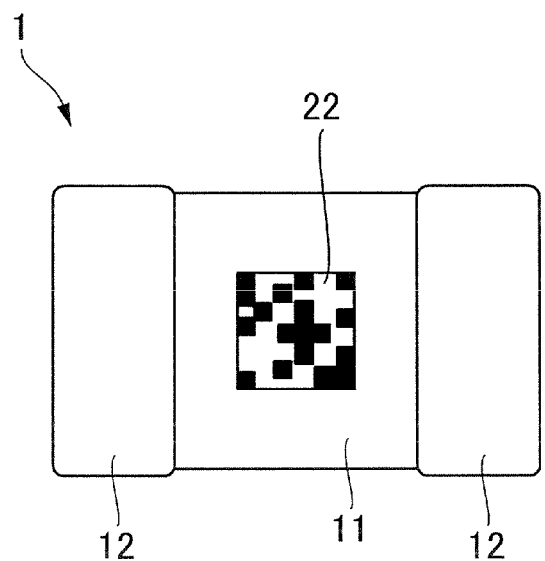
FIG. 11A is a schematic view of a passive electronic component as one aspect of the present invention.
Figure 11B:
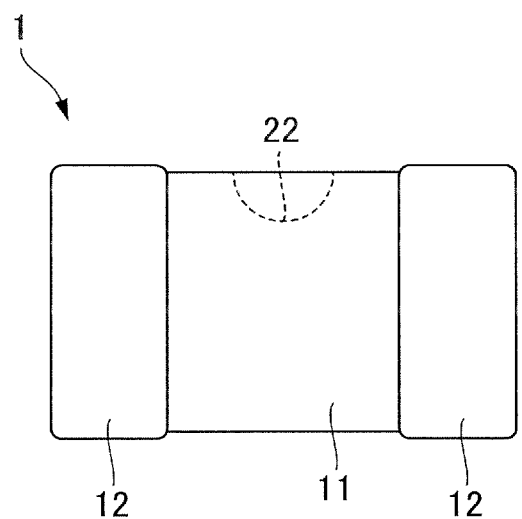
FIG. 11B is a schematic view of the passive electronic component as one aspect of the present invention.

FIGS. 11A and 11B are schematic views of a passive electronic component as one aspect of the present invention. There is shown, as an illustrative example, a coil component 1 as one aspect of the passive electronic component of the present invention. FIG. 11A is a top view of the coil component 1 and FIG. 11B is a side view of the coil component 1. In FIG. 11B, a marker portion 22, though having the same shape as that shown in FIG. 1C, is schematically depicted in a simplified manner. In this aspect, the marker portion 22 provided on a surface of an insulator portion 11 of the coil component 1 may be a reading code. Regardless of a position of the marker portion 22, by the reading code of the marker portion 22, there may be indicated a winding start position and a winding direction of a conductor of the coil component 1. In one example, the reading code can also include information other than a winding start position and a winding direction of a conductor. While the foregoing describes the coil component 1 as an example, also in any other type of passive electronic component, a posture and an orientation of the component may be indicated, and information other than a posture and an orientation of the component may be included, thus providing similar advantages.

Figure 12A:
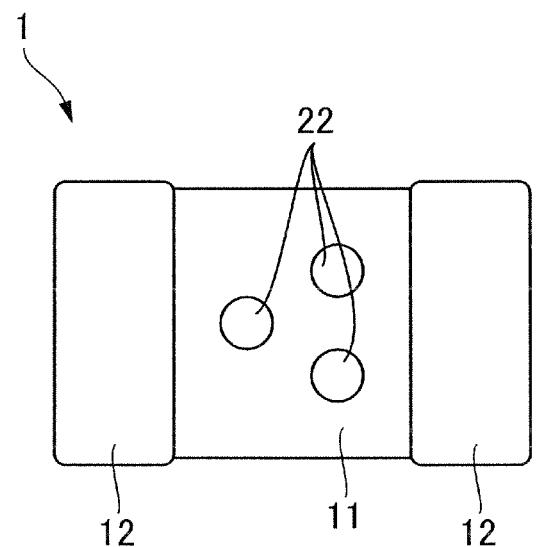
FIG. 12A is a schematic view of a passive electronic component as one aspect of the present invention.
Figure 12B:
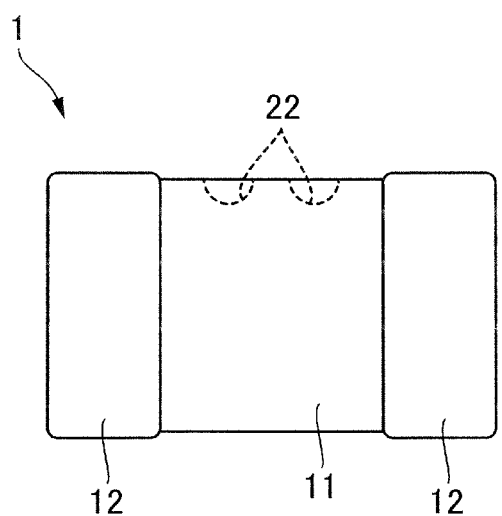
FIG. 12B is a schematic view of the passive electronic component as one aspect of the present invention.

FIGS. 12A and 12B are schematic views of a passive electronic component as one aspect of the present invention. There is shown, as an illustrative example, a coil component 1 as one aspect of the passive electronic component of the present invention. FIG. 12A is a top view of the coil component 1 and FIG. 12B is a side view of the coil component 1. In FIG. 12B, a marker portion 22, though having the same shape as that shown in FIG. 1C, is schematically depicted in a simplified manner. In this aspect, the marker portion 22 provided on a surface of an insulator portion 11 of the coil component 1 may be formed of a plurality of recessed portions disposed asymmetrically. "Being disposed asymmetrically" may refer to a state where the disposition is not required to be asymmetrical with respect to all axes in a shape defined by the disposition but is asymmetrical with respect to at least one of the axes therein, and this asymmetry property can indicate an orientation. For example, in a case where the shape defined by the disposition is an equilateral triangle, the equilateral triangular shape may be, though being symmetrical with respect to an axis of a normal extending from each vertex thereof to an opposed side thereof, asymmetrical with respect to each axis connecting midpoints of arbitrary two of sides thereof, and this asymmetry property can indicate an orientation. Thus, in the present invention, such a shape defined by disposing the recessed portions in the shape of an equilateral triangle may also be included in asymmetrical shapes. In one example, the marker portion 22 may be formed of three recessed portions of a circular shape in top view, which are disposed at positions of vertexes of an equilateral triangle, and provided so as to be asymmetrical with respect to an axis orthogonal to an axis connecting terminal electrodes to each other. Based on an orientation indicated by the asymmetrical disposition, there may be indicated a winding start position and a winding direction of a conductor of the coil component 1. It may be also possible that a shape defined by disposing a plurality of recessed portions constituting the marker portion 22 is in a shape other than a triangular shape as long as the shape is asymmetrical, and the recessed portions are in a shape other than a circular shape. While the foregoing describes the coil component 1 as an example, also in any other type of passive electronic component, a posture and an orientation of the component may be indicated, thus providing similar advantages.

Figure 13A:
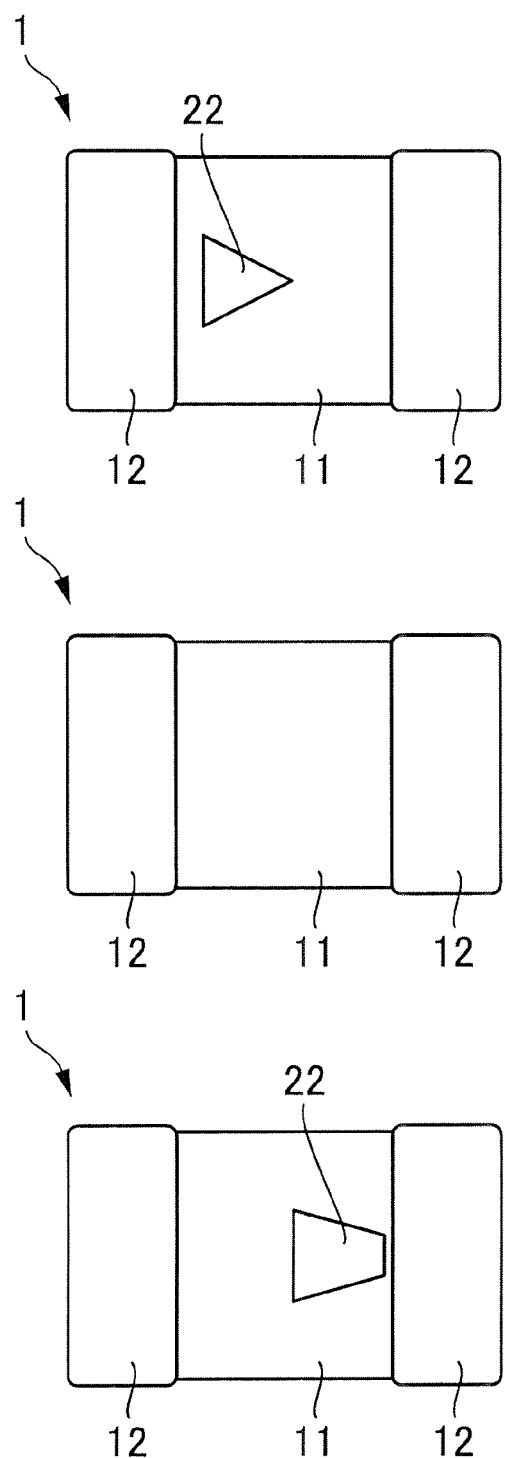
FIG. 13A is a schematic view of a passive electronic component as one aspect of the present invention.
Figure 13B:
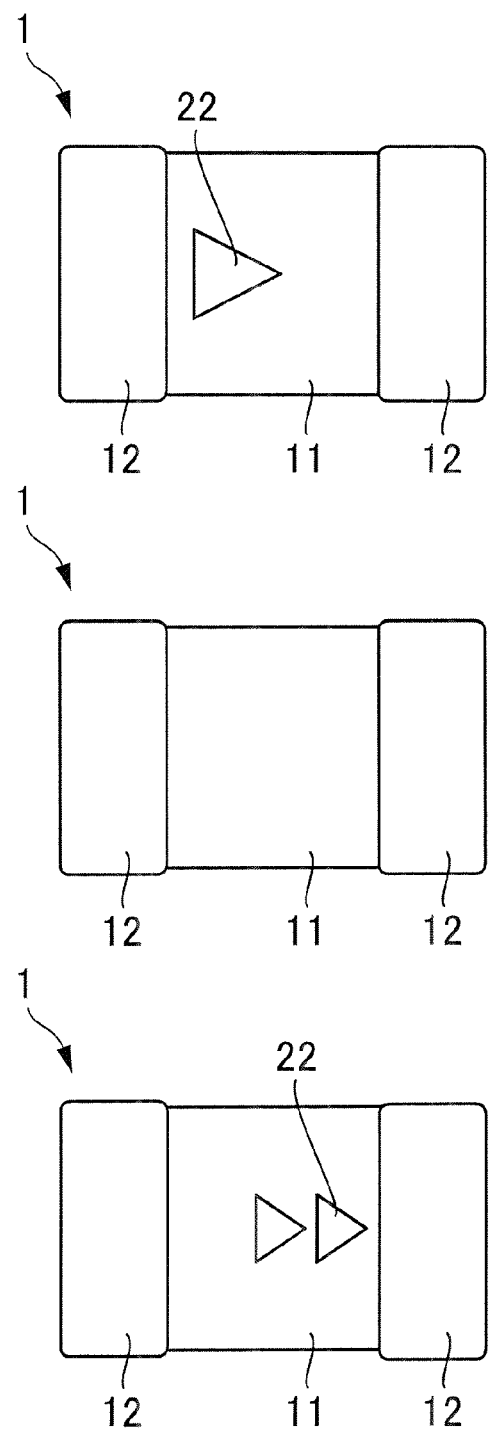
FIG. 13B is a schematic view of the passive electronic component as one aspect of the present invention.
Figure 13C:
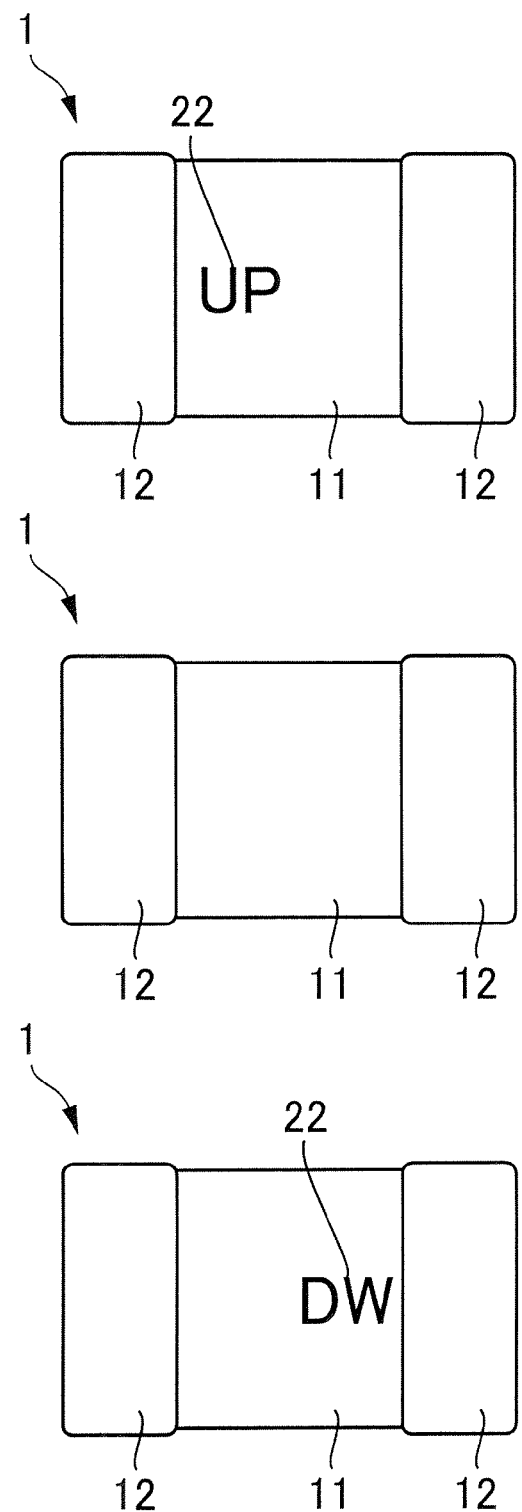
FIG. 13C is a schematic view of the passive electronic component as one aspect of the present invention.

FIGS. 13A, 13B, and 13C are schematic views of a passive electronic component as one aspect of the present invention. There is shown, as an illustrative example, a coil component 1 as one aspect of the passive electronic component of the present invention. FIGS. 13A, 13B, and 13C illustrate three different aspects from each other. The drawings on an upper side are top views, the drawings in the middle are side views, and the drawings on a lower side are bottom views. In FIGS. 13A, 13B, and 13C, a marker portion 22 may be provided on each of two upper and lower surfaces of an insulator portion 11, and respective positions of the two marker portions 22 may be asymmetrical with respect to a center surface between the upper and lower surfaces. In FIGS. 13A, 13B, and 13C, the marker portion 22 on the upper surface may be positioned on the left, and the marker portion 22 on the lower surface may be positioned on the right. It may also be possible that the marker portion 22 on the upper surface is positioned on the right, and the marker portion 22 on the lower surface is positioned on the left.

In the aspect shown in FIG. 13A, the marker portions 22 of different shapes from each other may be provided on the upper and lower surfaces, respectively. The marker portion 22 provided on the upper surface may be a recessed portion of a triangular shape, and the marker portion 22 provided on the lower surface may be a recessed portion of a trapezoidal shape. In this aspect, not only may a winding start position and a winding direction of a conductor of the coil component 1 be indicated based on a shape of the marker portion 22 but also the upper and lower surfaces of the insulator portion 11 of the coil component 1 can be distinguished from each other based on a difference in position and shape between the marker portions 22 provided thereon. While the foregoing describes the coil component 1 as an example, also in any other type of passive electronic component, a posture and an orientation of the component may be indicated, and the upper and lower surfaces of the component can be distinguished from each other, thus providing similar advantages.

In the aspect shown in FIG. 13B, different numbers of the marker portions 22 may be provided on the upper and lower surfaces of the insulator portion 11, respectively. The marker portion 22 provided on the upper surface may be one recessed portion of a triangular shape, and the marker portions 22 provided on the lower surface may be two recessed portions of a rectangular shape. In this aspect, not only may a winding start position and a winding direction of a conductor of the coil component 1 be indicated based on a shape of the marker portion 22 but also the upper and lower surfaces of the insulator portion 11 of the coil component 1 can be distinguished from each other based on a difference in position and number between the marker portions 22 provided thereon. While the foregoing describes the coil component 1 as an example, also in any other type of passive electronic component, a posture and an orientation of the component may be indicated, and the upper and lower surfaces of the component can be distinguished from each other, thus providing similar advantages.

In the aspect shown in FIG. 13C, the marker portion 22 may represent a character, and the marker portions 22 representing different characters from each other may be provided on the upper and lower surfaces of the insulator portion 11, respectively. The marker portion 22 provided on the upper surface may be a recessed portion representing a character "UP", and the marker portion 22 provided on the lower surface may be a recessed portion representing a character "DW". In this aspect, not only may a winding start position and a winding direction of a conductor of the coil component 1 be indicated based on a position of the marker portion 22 but also the upper and lower surfaces of the insulator portion 11 of the coil component 1 can be distinguished from each other based on a difference in position and character between the marker portions 22 provided thereon. Furthermore, in this aspect, by using a character, information other than a winding start position and a winding direction of a conductor and a distinction between the upper and lower surfaces can also be indicated. While the foregoing describes the coil component 1 as an example, also in any other type of passive electronic component, a posture and an orientation of the component may be indicated, the upper and lower surfaces of the component can be distinguished from each other, and information other than a posture and an orientation of the component and a distinction between the upper and lower surfaces of the component may be indicated, thus providing similar advantages.

In the present invention, for the sake of convenience, the "upper surface" and the "lower surface" may refer to arbitrary opposed two of the plurality of surfaces of the insulator portion and may not necessarily need to be at an upper portion and a lower portion, respectively. The marker portion can be provided on each of arbitrary opposed two of the plurality of surfaces of the insulator portion.

Figure 14A:
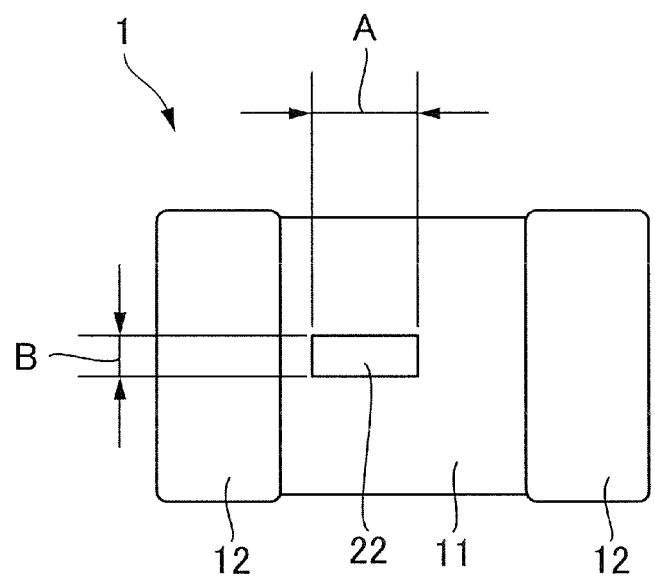
FIG. 14A is a schematic view outlining dimensions of the marker portion in a longer-side direction and a shorter-side direction of an insulator portion.
Figure 14B:
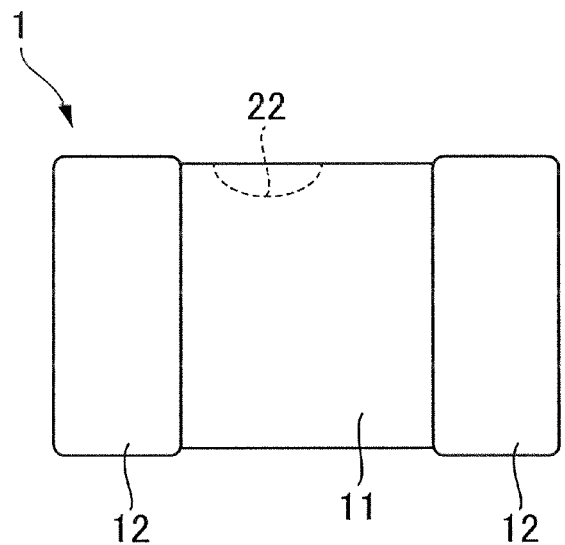
FIG. 14B is a schematic view outlining the dimensions of the marker portion in the longer-side direction and the shorter-side direction of the insulator portion.

FIGS. 14A and 14B are schematic views of a passive electronic component as one aspect of the present invention. There is shown, as an illustrative example, a coil component 1 as another embodiment of the passive electronic component of the present invention. FIG. 14A is a top view of the coil component 1 and FIG. 14B is a side view of the coil component 1. In FIG. 14B, a marker portion 22, though having the same shape as that shown in FIG. 1C, is schematically depicted in a simplified manner. As shown in FIG. 14A, the marker portion 22 may be formed as a recessed portion of a rectangular shape. Here, a direction connecting two terminal electrodes 12 of the coil component 1, namely, a left-and-right direction on a paper plane may be defined as a longer-side direction, and a direction orthogonal to the longer-side direction, namely, an up-and-down direction on the paper plane may be defined as a shorter-side direction. Reference character A denotes a dimension of the marker portion 22 in the longer-side direction, and reference character B denotes a dimension of the marker portion 22 in the shorter-side direction. In this example, the marker portion 22 may be in such a shape that the dimension A thereof in the longer-side direction of the insulator portion 11 is longer than the dimension B thereof in the shorter-side direction of the insulator portion 11. That is, dimensions of the rectangular shape of the marker portion 22 may have a relationship A>B. An absorption pad of a mounter may normally have a circular cross section. Upon contact with an upper surface of a mounting component, an inside of a circular portion of the absorption pad may be decompressed to generate an absorption force on the upper surface of the mounting component, thereby holding the mounting component. In order to secure this absorption, it may be required to maintain a state where the inside of the circular portion is decompressed. When the dimensions of the rectangular shape of the marker portion 22 has the relationship A>B, it may become easier to maintain the decompressed state, and thus absorption by the absorption pad of the mounter can be secured. While the foregoing describes the coil component 1 as an example, similar advantages may be obtained also in any other type of passive electronic component. This will be described below in more detail with reference to FIGS. 15A, 15B, 15C, and 15D (a comparative example) and FIGS. 16A, 16B, 16C, and 16D (the present invention).

Figure 15A:
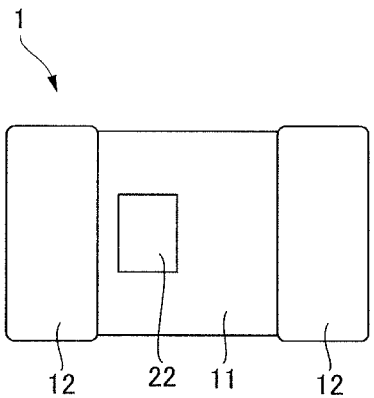
FIG. 15A is a schematic view of a passive electronic component having a marker portion of a shape that is longer in a shorter-side direction of an insulator portion.
Figure 15C:
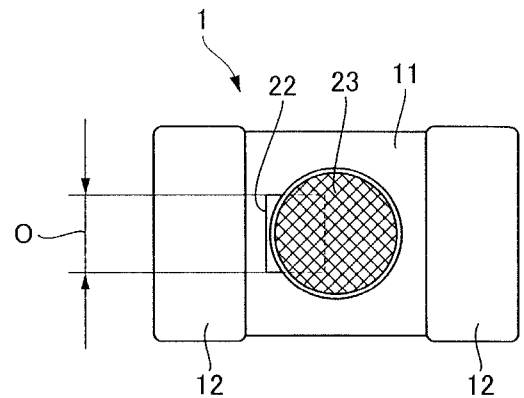
FIG. 15C is a schematic view of the passive electronic component having the marker portion of the shape that is longer in the shorter-side direction of the insulator portion.
Figure 15B:
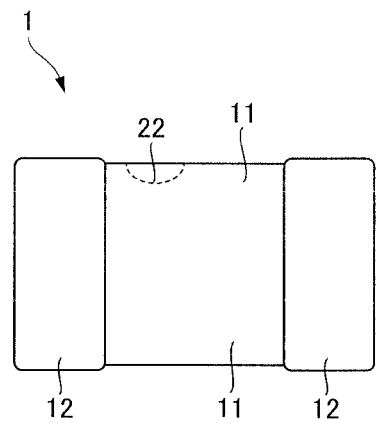
FIG. 15B is a schematic view of the passive electronic component having the marker portion of the shape that is longer in the shorter-side direction of the insulator portion.
Figure 15D:
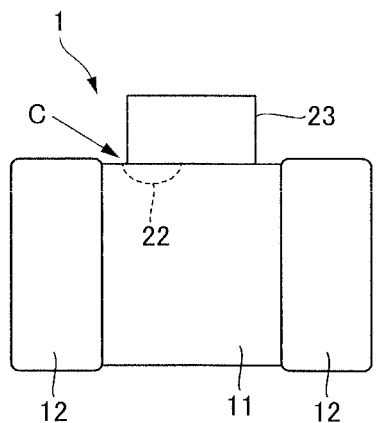
FIG. 15D is a schematic view of the passive electronic component having the marker portion of the shape that is longer in the shorter-side direction of the insulator portion.

FIGS. 15A, 15B, 15C, and 15D are schematic views of a coil component as a comparative example. FIGS. 15A and 15C are top views of a coil component 1 and FIGS. 15B and 15D are side views of the coil component 1. In FIGS. 15B and 15D, a marker portion 22, though having the same shape as that shown in FIG. 1C, is schematically depicted in a simplified manner. FIGS. 15C and 15D schematically depict an absorption pad 23 of a mounter. Reference character O denotes a length, in a shorter-side direction, of a portion in which the marker portion 22 and the absorption pad 23 overlap each other. In this comparative example, the marker portion 22 may be in a shape elongated in the shorter-side direction of an insulator portion 11, and thus the length O along which an outer edge of the absorption pad 23 of the mounter and the marker portion 22 overlap each other may be increased, so that a magnitude of vacuum leakage from a gap C between the absorption pad 23 and the marker portion 22 may be increased.

Figure 16A:
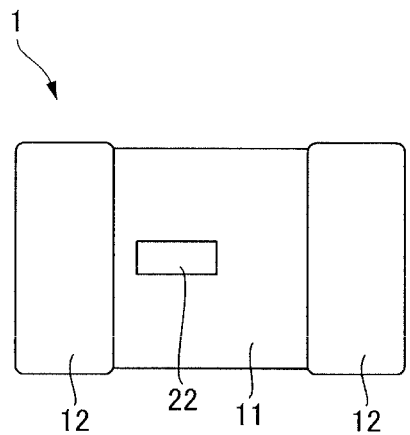
FIG. 16A is a schematic view of a passive electronic component as one aspect of the present invention, which has a marker portion of a shape that is longer in a longer-side direction of an insulator portion.
Figure 16C:
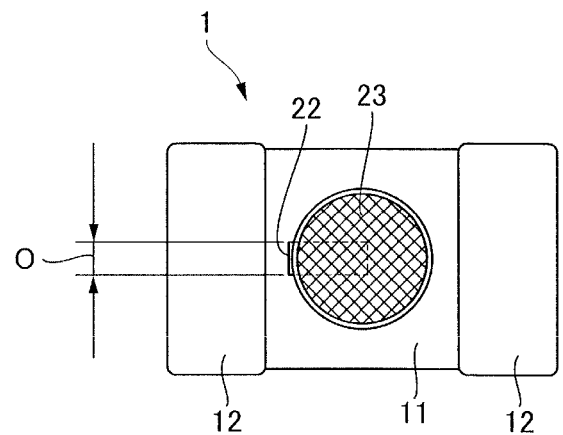
FIG. 16C is a schematic view of the passive electronic component as one aspect of the present invention, which has the marker portion of the shape that is longer in the shorter-side direction of the insulator portion.
Figure 16B:
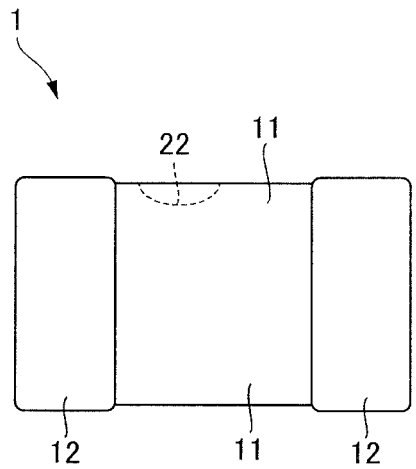
FIG. 16B is a schematic view of the passive electronic component as one aspect of the present invention, which has the marker portion of the shape that is longer in the shorter-side direction of the insulator portion.
Figure 16D:
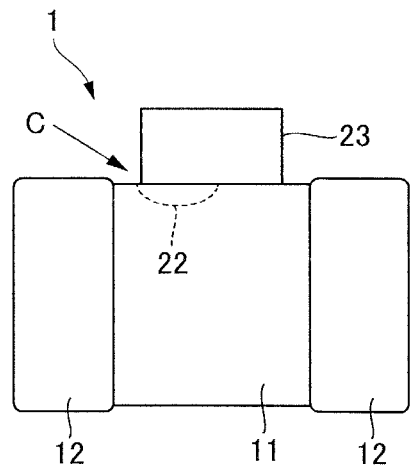
FIG. 16D is a schematic view of the passive electronic component as one aspect of the present invention, which has the marker portion of the shape that is longer in the shorter-side direction of the insulator portion.

FIGS. 16A, 16B, 16C, and 16D are schematic views of a passive electronic component as one aspect of the present invention. There is shown, as an illustrative example, a coil component 1 as one aspect of the passive electronic component of the present invention. FIGS. 16A and 16C are top views of the coil component 1 and FIGS. 16B and 16D are side views of the coil component 1. In FIGS. 16B and 16D, a marker portion 22, though having the same shape as that shown in FIG. 1C, is schematically depicted in a simplified manner. FIGS. 16C and 16D schematically depict an absorption pad 23 of a mounter. Reference character O denotes a length, in a shorter-side direction, of a portion in which the marker portion 22 and the absorption pad 23 overlap each other. In this aspect, the marker portion 22 may be in a shape elongated in a longer-side direction of an insulator portion 11, and thus the length O along which an outer edge of the absorption pad 23 of the mounter and the marker portion 22 overlap each other may be decreased, so that a magnitude of vacuum leakage from a gap C between the absorption pad 23 and the marker portion 22 may be decreased. As described above, in the coil component 1 of the present invention, absorption by the absorption pad 23 of the mounter may be further secured. While the foregoing describes the coil component 1 as an example, similar advantages may be obtained also in any other type of passive electronic component.

Figure 17A:
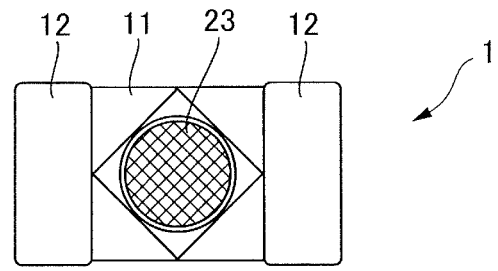
FIG. 17A is a schematic view of a passive electronic component as one aspect of the present invention, which has a marker portion located on an outer side of a quadrangle formed by linking midpoints of respective sides of an insulator portion.
Figure 17B:
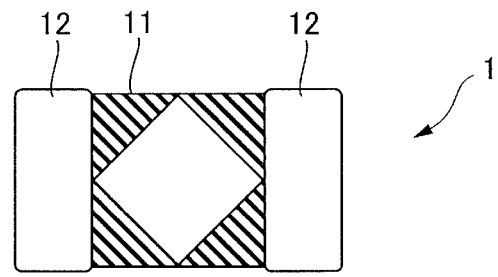
FIG. 17B is a schematic view of the passive electronic component as one aspect of the present invention, which has the marker portion located on the outer side of the quadrangle formed by linking the midpoints of the respective sides of the insulator portion.
Figure 17C:
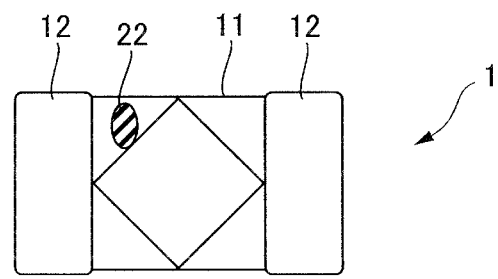
FIG. 17C is a schematic view of the passive electronic component as one aspect of the present invention, which has the marker portion located on the outer side of the quadrangle formed by linking the midpoints of the respective sides of the insulator portion.
Figure 17D:
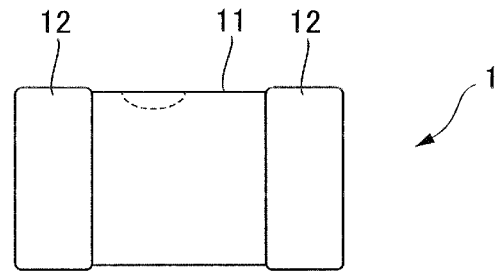
FIG. 17D is a schematic view of the passive electronic component as one aspect of the present invention, which has the marker portion located on the outer side of the quadrangle formed by linking the midpoints of the respective sides of the insulator portion.
Figure 17E:
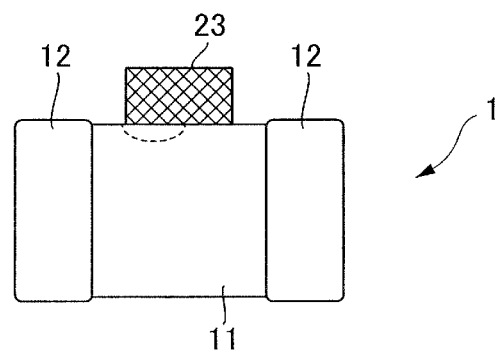
FIG. 17E is a schematic view of the passive electronic component as one aspect of the present invention, which has the marker portion located on the outer side of the quadrangle formed by linking the midpoints of the respective sides of the insulator portion.

FIGS. 17A, 17B, 17C, 17D, and 17E are schematic views of a passive electronic component as one aspect of the present invention. It is shown that a marker portion 22 of a coil component 1 as one aspect of the passive electronic component of the present invention is located on an outer side of a quadrangle formed by linking midpoints of respective sides of an insulator portion 11. FIGS. 17A, 17B, and 17C are top views of the coil component 1, and FIGS. 17D and 17E are side views of the coil component 1. In FIGS. 17D and 17E, a marker portion 22, though having the same shape as that shown in FIG. 1C, is schematically depicted in a simplified manner. FIG. 17A schematically depicts a position of an absorption pad 23 of a mounter. FIG. 17B shows the quadrangle formed by linking the midpoints of the respective sides of the insulator portion 11. A hatching portion indicates the outer side of the quadrangle formed by linking the midpoints of the respective sides of the insulator portion 11. FIG. 17C shows the marker portion 22 provided on the outer side of the quadrangle formed by linking the midpoints of the respective sides of the insulator portion 11. FIG. 17E schematically depicts a position of the absorption pad 23 of the mounter in the side view of FIG. 17D.

When an outer edge portion of the absorption pad comes in contact with a terminal electrode, there may be a risk of damaging a plated portion on a surface of the terminal electrode. Because of this, the absorption pad may normally be brought in contact with an upper surface of a mounting component so as not to come in contact with the terminal electrode. Furthermore, a curved surface may be formed at an end portion of a mounting component, in which case, there may be a problem that, when in contact with such a curved surface, the absorption pad cannot maintain a vacuum state. Because of this, normally, the absorption pad may be so used that the outer edge portion thereof does not come in contact with an end portion of a mounting component. Moreover, the absorption pad may be set so as to absorb a center portion of the component as much as possible. The absorption pad may, therefore, absorb an inner side portion relative to a line linking midpoints of respective end sides of external electrodes and a mounting component, and it may be desirable that the marker portion be provided outside this portion. In this case, it may be most desirable that the marker portion be provided outside an ellipse area whose major axis and minor axis are lines linking the midpoints of the respective sides of the insulator portion.

As shown in FIGS. 17B and 17C, the marker portion 22 may be provided on the outer side of the quadrangle formed by linking the midpoints of the respective sides of the insulator portion 1, and thus contact between the absorption pad 23 of the mounter and the marker portion 22 can be avoided. Although, as shown in FIG. 17E, in the side view, the marker portion 22 and the absorption pad 23 of the mounter may be seen as if their positions overlap with each other, as shown in FIGS. 17A to 17C, in the top views, the respective positions of the marker portion 22 and the absorption pad 23 of the mounter may not overlap each other. As described above, the marker portion 22 may be provided on the outer side of the quadrangle formed by linking the midpoints of the respective sides of the insulator portion 1, and thus the absorption pad may be prevented from causing vacuum leakage. Thus, in the coil component of the present invention, absorption by the absorption pad 23 of the mounter may be further secured. While the foregoing describes the coil component 1 as an example, similar advantages may be obtained also in any other type of passive electronic component.

Furthermore, as another embodiment, i.e., Embodiment 3 of the method for manufacturing the coil component 1 of the present invention, there may also be a method in which the conductor portion is formed by using a conductive wire in place of the conductor paste used in Embodiment 2. As the conductive wire, preferably, a coated conductive wire may be used. In this case, an insulating body may be formed by winding the conductive wire to form a coil-shaped conductor, disposing a filler and a resin around the coil-shaped conductor, and curing the resin by heating. As a marker used in this manufacturing method, there may be selected, for example, a resin that shrinks to a greater degree when the insulating body formed of the filler and the resin are formed by heating. Disposition of the marker portion and a method for disposing the marker may be performed prior to heating in a similar manner to those in Embodiments 1 and 2 mentioned earlier. In the marker portion, due to pressure, the surface on which the marker is disposed may be recessed by an amount substantially equal to a thickness of the marker, so that an upper surface of the marker and the surface on which the marker is disposed may become substantially flush with each other. Moreover, by a heat treatment, the marker may shrink in a thickness direction thereof, so that an upper surface of the marker portion may recede to a position lower in level than a surface of the surface on which the marker is disposed. Thus, the upper surface of the marker portion can be prevented from rubbing against or bumping into any other object.

Figure 18A:
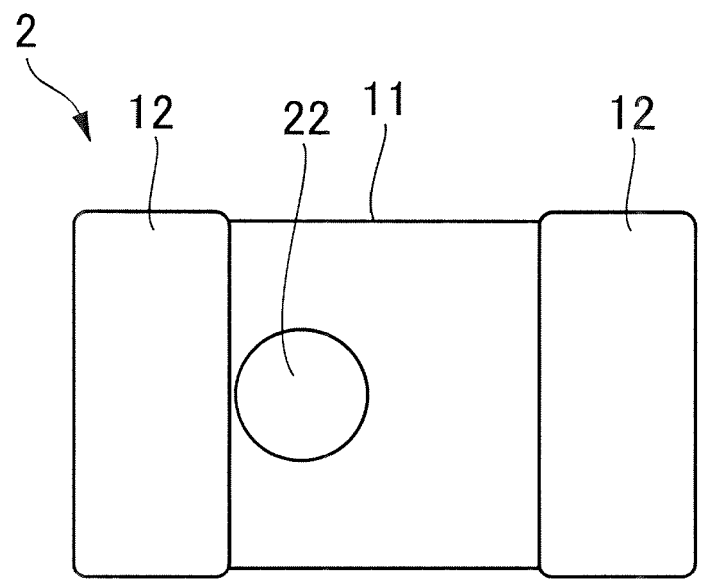
FIG. 18A is a schematic view of a passive electronic component as one aspect of the present invention.
Figure 18A:
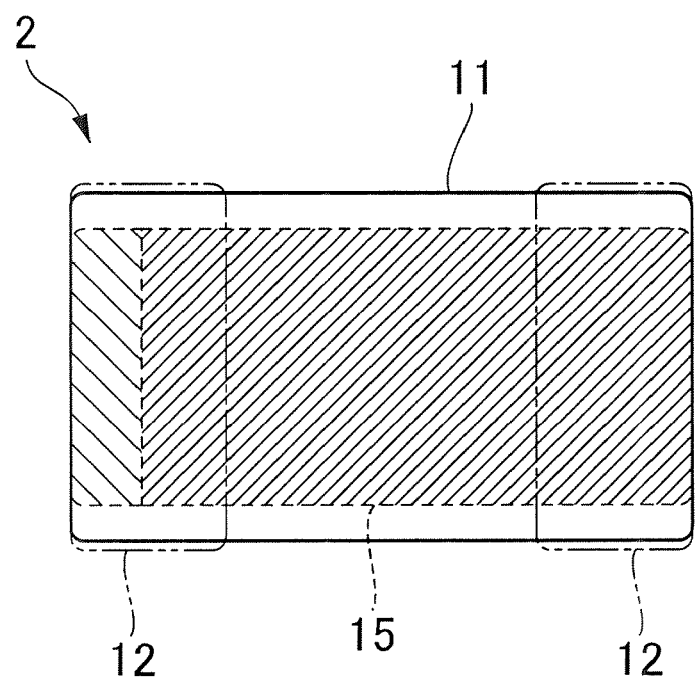
Figure 18B:
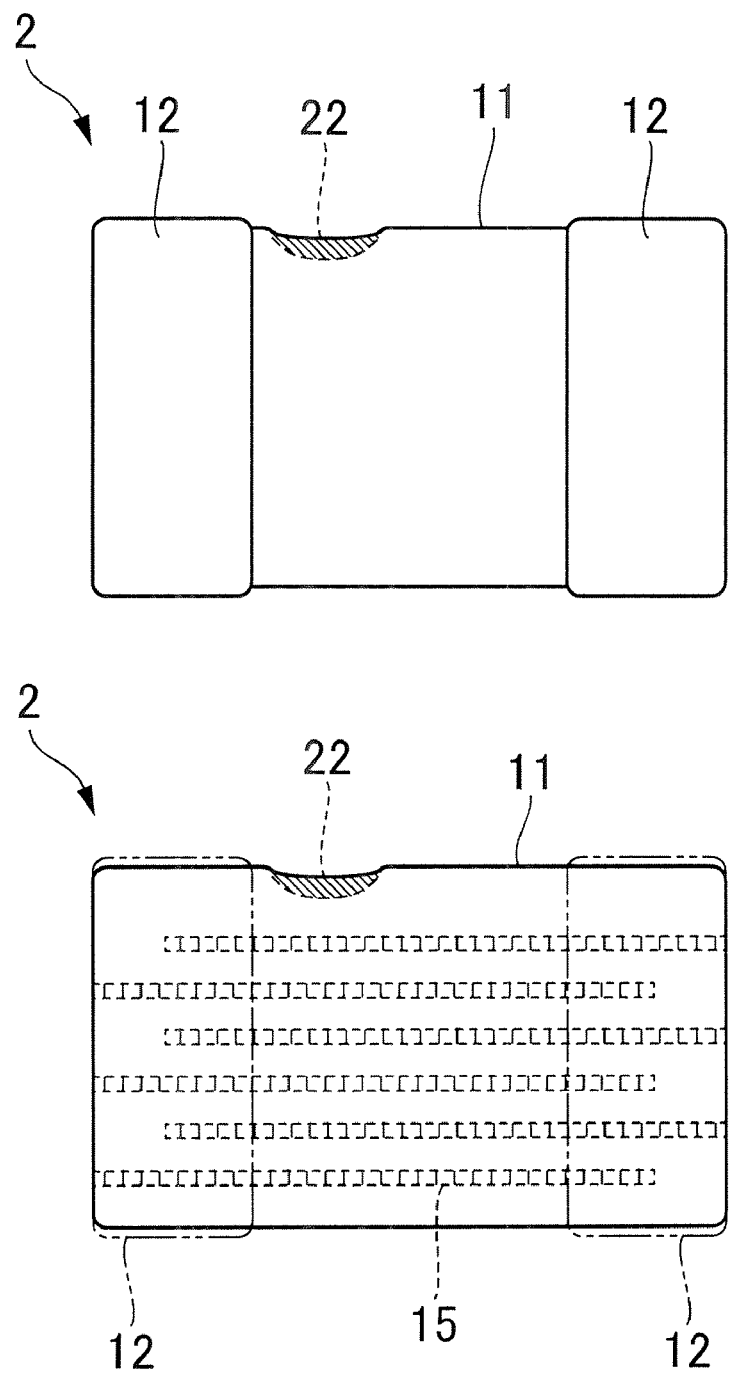
FIG. 18B is a schematic view of the passive electronic component as one aspect of the present invention.
Figure 18C:
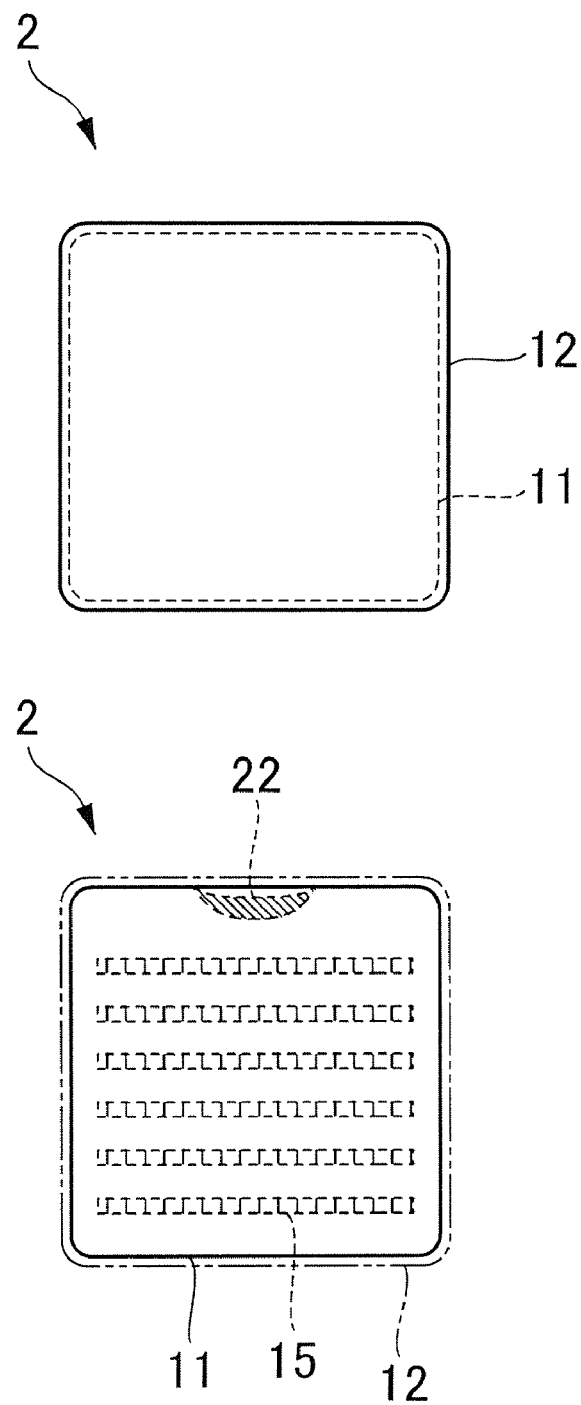
FIG. 18C is a schematic view of the passive electronic component as one aspect of the present invention.

FIGS. 18A, 18B, and 18C are schematic views of a passive electronic component as one aspect of the present invention. There is shown a capacitor component 2 as one aspect of the passive electronic component of the present invention. FIG. 18A is a top view of the capacitor component 2, FIG. 18B is a side view of the capacitor component 2, and FIG. 18C is a side view of the capacitor component 2 different from FIG. 18B. Even when a difference between a dimension of the capacitor component 2 in a width direction thereof and a dimension of the capacitor component 2 in a height direction thereof is small, by identifying the marker portion 22, the capacitor component 2 can be mounted in a designed orientation. The advantages of the passive electronic component mentioned above by using the coil component 1 as an example may also apply to the capacitor component 2 of the present invention.

For example, as a material of a marker, a material having a property of shrinking when heated may be used, and thus when a laminated body is calcined, an upper surface of a marker portion 22 may recede to a position lower in level than a surface of an uppermost one of sheets, so that an upper surface of the marker portion can be prevented from rubbing against or bumping into any other object. For example, the marker portion 22 may be configured to have such a depth as not to affect an electrical property of a conductor portion, and thus the marker portion 22 and the conductor portion may be prevented from interfering with each other and thus causing a short circuit of the conductor portion. For example, the marker portion 22 may be reduced in size, and thus the marker portion 22 can be prevented from interfering with an absorption pad of a mounter, or contact between the marker portion 22 and a terminal electrode 12 can be avoided. For example, the marker portion 22 and the terminal electrode 12 may be spaced from each other by a particular distance, and thus the marker portion 22 may be prevented from affecting an electrical property of a capacitor 2. For example, the marker portion 22 may be provided on an outer side of a quadrangle formed by linking midpoints of respective sides of a surface having the marker portion 22, and thus the absorption pad may be prevented from causing vacuum leakage. For example, the marker portion 22 may be in a shape elongated in a longer-side direction of the insulator portion, and thus absorption by the absorption pad of the mounter can be secured. For example, the marker portion 22 may be in an asymmetrical shape, or a shape defined by disposing a plurality of the marker portions 22 may be asymmetrical, and thus a posture and an orientation of the capacitor component 2 can be indicated. For example, the marker portion 22 may be a character or a reading code, so that a posture and an orientation of the capacitor component 2 can be indicated, and information other than a posture and an orientation of the capacitor component 2 can be included. For example, the marker portion 22 may be provided on each of opposed two of surfaces of the capacitor component 2, so that a posture and an orientation of the capacitor component 2 can be indicated, information other than a posture and an orientation of the capacitor component 2 can be included, and information other than a posture and an orientation of the capacitor component 2 and a distinction between upper and lower surfaces of the capacitor component 2 can be indicated.

According to the present invention, the marker portion is provided in the recessed portion on the surface of the insulator portion, and thus ink in the marker portion may be prevented from being faded due to friction, or adhesion of dirt or the like to the marker portion may be prevented. Thus, the marker portion of the passive electronic component can be recognized reliably. Furthermore, according to the present invention, even in a case of an electronic component of a reduced size, a marker portion thereof can be recognized reliably, and thus the present invention can accommodate miniaturization of components.

What is claimed is:

1. A method for manufacturing a passive electronic component, the passive electronic component including an insulator portion, a conductor portion provided in the insulator portion, a terminal electrode electrically connected to the conductor portion and disposed on at least one of surfaces of the insulator portion, and at least one marker portion provided in at least one recessed portion of at least one of the surfaces of the insulator portion, the method comprising the steps of:
   stacking together a plurality of lamination sheets each containing a resin;
   disposing at least one marker portion on an uppermost lamination sheet and among the plurality of lamination sheets;
   press-bonding the plurality of lamination sheets stacked together, to obtain a laminate; and
   dicing the laminate into parts of a desired size and heating the parts,
   wherein the step to obtain the laminate includes pressing in the at least one marker portion disposed on the lamination sheets in a lamination direction of the plurality of lamination sheets, such that an upper surface of the at least one marker portion becomes concave from an upper surface of the uppermost lamination sheet.

2. The method for manufacturing a passive electronic component according to claim 1,
   wherein a material of a marker in the at least one marker portion is glass or an organic resin, and
   wherein the step of heating includes allowing thermal contraction of the marker.

3. The method for manufacturing a passive electronic component according to claim 2,
   wherein the material of the marker in the at least one marker portion is an organic resin, and
   wherein the organic resin has a larger coefficient of thermal contraction than the resin.

4. The method for manufacturing a passive electronic component according to claim 2, wherein the material of the marker in the at least one marker portion is glass.

5. The method for manufacturing a passive electronic component according to claim 1, wherein the at least one marker portion provided in the at least one recessed portion has such a depth as not to affect electrical characteristics of the conductor portion.

6. The method for manufacturing a passive electronic component according to claim 5, wherein the depth is smaller than 50% of a distance between the associated surface of the insulator portion and a portion of the conductor portion closest to the associated surface of the insulator portion.

7. The method for manufacturing a passive electronic component according to claim 1, wherein an area of the at least one marker portion provided in the at least one recessed portion is equal to or smaller than 40% of a surface area of one of the surfaces of the insulator portion having the at least one marker portion provided in the at least one recessed portion.

8. The method for manufacturing a passive electronic component according to claim 1, wherein the at least one marker portion provided in the at least one recessed portion is positioned so as not to contact with the terminal electrode.

9. The method for manufacturing a passive electronic component according to claim 1, wherein the at least one marker portion provided in the at least one recessed portion is outside a quadrangle formed by connecting midpoints of sides of the insulator portion.

10. The method for manufacturing a passive electronic component according to claim 1, wherein the at least one marker portion provided in the at least one recessed portion is elongated in a longitudinal direction of the insulator portion.

11. The method for manufacturing a passive electronic component according to claim 1, wherein the at least one marker portion provided in the at least one recessed portion has an asymmetrical shape.

12. The method for manufacturing a passive electronic component according to claim 1,
wherein the at least one marker portion comprises a plurality of marker portions positioned in a plurality of recessed portions, and
wherein a shape defined by arrangement of the plurality of marker portions is asymmetrical.

13. The method for manufacturing a passive electronic component according to claim 1, wherein the at least one marker portion represents at least one selected from the group consisting of a character and a reading code.

14. The method for manufacturing a passive electronic component according to claim 1,
wherein the at least one marker portion comprises at least two marker portions positioned in at least two recessed portions, and
wherein the at least two marker portions are provided on two opposed surfaces of the insulator portion, respectively.

15. The method for manufacturing a passive electronic component according to claim 14, wherein positions of the at least two marker portions positioned in the at least two recessed portions are asymmetrical to each other.

16. The method for manufacturing a passive electronic component according to claim 1,
wherein the passive electronic component is a coil component, and
wherein in a projective view from the surface having the at least one marker portion provided in the at least one recessed portion, the at least one marker portion is positioned so as not to overlap the conductor portion.

17. The method for manufacturing a passive electronic component according to claim 1,
wherein the passive electronic component is a coil component, and
wherein the conductor portion includes a via portion connecting between layers of a conductor in the conductor portion, and in a projective view from the surface having the at least one marker portion provided in the at least one recessed portion, the at least one marker portion is positioned so as not to overlap the via portion.

18. The method for manufacturing a passive electronic component according to claim 1,
wherein the passive electronic component is a coil component, and
wherein a position of the at least one marker portion provided in the at least one recessed portion, which position is within the associated surface of the insulator portion, indicates a winding start position and a winding direction of a conductor of the coil component.

19. The method for manufacturing a passive electronic component according to claim 1,
wherein the passive electronic component is a coil component, and
wherein a shape of the at least one marker portion provided in the at least one recessed portion indicates a winding start position and a winding direction of a conductor of the coil component.

20. A method for manufacturing a passive electronic component, the passive electronic component including an insulator portion, a conductor portion provided in the insulator portion, a terminal electrode electrically connected to the conductor portion and disposed on at least one of surfaces of the insulator portion, and at least one marker portion provided in at least one recessed portion of at least one of the surfaces of the insulator portion, the method comprising the steps of:
stacking together a plurality of lamination sheets each containing a resin;
disposing at least one marker portion on a lowermost lamination sheet among the plurality of lamination sheets;
press-bonding the plurality of lamination sheets stacked together, to obtain a laminate; and
dicing the laminate into parts of a desired size and heating the parts,
wherein the step to obtain the laminate includes pressing in the at least one marker portion disposed on the lamination sheets in a lamination direction of the plurality of lamination sheets, such that a lower surface of the at least one marker portion becomes concave from a lower surface of the lowermost lamination sheet.

* * * * *